United States Patent
Talin et al.

(10) Patent No.: US 7,020,374 B2
(45) Date of Patent: Mar. 28, 2006

(54) OPTICAL WAVEGUIDE STRUCTURE AND METHOD FOR FABRICATING THE SAME

(75) Inventors: Albert Alec Talin, Livermore, CA (US); Steven A. Voight, Gilbert, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 81 days.

(21) Appl. No.: 10/356,550

(22) Filed: Feb. 3, 2003

(65) Prior Publication Data

US 2004/0151463 A1 Aug. 5, 2004

(51) Int. Cl.
*G02B 6/10* (2006.01)

(52) U.S. Cl. .................... 385/131; 385/132
(58) Field of Classification Search ......... 385/129–132
See application file for complete search history.

(56) References Cited

U.S. PATENT DOCUMENTS

| | | |
|---|---|---|
| 3,670,213 A | 6/1972 | Nakawaga et al. |
| 3,758,199 A | 9/1973 | Thaxter |
| 3,766,370 A | 10/1973 | Walther |
| 3,802,967 A | 4/1974 | Ladany et al. |
| 3,818,451 A | 6/1974 | Coleman |
| 3,914,137 A | 10/1975 | Huffman et al. |
| 3,935,031 A | 1/1976 | Adler |
| 4,006,989 A | 2/1977 | Andringa |
| 4,084,130 A | 4/1978 | Holton |
| 4,120,588 A | 10/1978 | Chaum |
| 4,146,297 A | 3/1979 | Alferness et al. |
| 4,174,422 A | 11/1979 | Matthews et al. |
| 4,174,504 A | 11/1979 | Chenausky et al. |
| 4,242,595 A | 12/1980 | Lehovec |
| 4,284,329 A | 8/1981 | Smith et al. |
| 4,289,920 A | 9/1981 | Hovel |
| 4,297,656 A | 10/1981 | Pan |
| 4,298,247 A | 11/1981 | Michelet et al. |
| 4,378,259 A | 3/1983 | Hasegawa et al. |
| 4,392,297 A | 7/1983 | Little |
| 4,398,342 A | 8/1983 | Pitt et al. |
| 4,404,265 A | 9/1983 | Manasevit |
| 4,424,589 A | 1/1984 | Thomas et al. |
| 4,439,014 A | 3/1984 | Stacy et al. |
| 4,442,590 A | 4/1984 | Stockton et al. |
| 4,447,116 A | 5/1984 | King et al. |
| 4,452,720 A | 6/1984 | Harada et al. |
| 4,459,325 A | 7/1984 | Nozawa et al. |

(Continued)

FOREIGN PATENT DOCUMENTS

DE 196 07 107 8/1997

(Continued)

OTHER PUBLICATIONS

Peter Weiss; "Speed demon gets hooked on silicon"; Science News Online; Sep. 15, 2001; pp. 1-3.

(Continued)

*Primary Examiner*—Akm Enayet Ullah
*Assistant Examiner*—Omar Rojas
(74) *Attorney, Agent, or Firm*—Oblon, Spivak, McClelland, Maier & Neustadt, P.C.

(57) ABSTRACT

An optical waveguide structure (10) is provided. The optical waveguide structure (10) has a monocrystalline substrate (12), an amorphous interface layer (14) overlying the monocrystalline substrate (12) and an accommodating buffer layer (16) overlying the amorphous interface layer (14). An optical waveguide layer (20) overlies the accommodating buffer layer (16).

17 Claims, 1 Drawing Sheet

U.S. PATENT DOCUMENTS

| | | |
|---|---|---|
| 4,482,422 A | 11/1984 | McGinn et al. |
| 4,482,906 A | 11/1984 | Hovel et al. |
| 4,484,332 A | 11/1984 | Hawrylo |
| 4,503,540 A | 3/1985 | Nakashima et al. |
| 4,523,211 A | 6/1985 | Morimoto et al. |
| 4,525,871 A | 6/1985 | Foyt et al. |
| 4,594,000 A | 6/1986 | Falk et al. |
| 4,626,878 A | 12/1986 | Kuwano et al. |
| 4,629,821 A | 12/1986 | Bronstein-Bonte et al. |
| 4,661,176 A | 4/1987 | Manasevit |
| 4,667,088 A | 5/1987 | Kramer |
| 4,667,212 A | 5/1987 | Nakamura |
| 4,681,982 A | 7/1987 | Yoshida |
| 4,723,321 A | 2/1988 | Saleh |
| 4,748,485 A | 5/1988 | Vasudev |
| 4,756,007 A | 7/1988 | Qureshi et al. |
| 4,772,929 A | 9/1988 | Manchester et al. |
| 4,773,063 A | 9/1988 | Hunsperger et al. |
| 4,774,205 A | 9/1988 | Choi et al. |
| 4,777,613 A | 10/1988 | Shahan et al. |
| 4,793,872 A | 12/1988 | Meunier et al. |
| 4,802,182 A | 1/1989 | Thornton et al. |
| 4,815,084 A | 3/1989 | Scifres et al. |
| 4,841,775 A | 6/1989 | Ikeda et al. |
| 4,843,609 A | 6/1989 | Ohya et al. |
| 4,845,044 A | 7/1989 | Ariyoshi et al. |
| 4,846,926 A | 7/1989 | Kay et al. |
| 4,855,249 A | 8/1989 | Akasaki et al. |
| 4,868,376 A | 9/1989 | Lessin et al. |
| 4,872,046 A | 10/1989 | Morkoc et al. |
| 4,876,208 A | 10/1989 | Gustafson et al. |
| 4,876,218 A | 10/1989 | Pessa et al. |
| 4,876,219 A | 10/1989 | Eshita et al. |
| 4,882,300 A | 11/1989 | Inoue et al. |
| 4,885,376 A | 12/1989 | Verkade |
| 4,888,202 A | 12/1989 | Murakami et al. |
| 4,889,402 A | 12/1989 | Reinhart |
| 4,891,091 A | 1/1990 | Shastry |
| 4,896,194 A | 1/1990 | Suzuki |
| 4,901,133 A | 2/1990 | Curran et al. |
| 4,910,164 A | 3/1990 | Shichijo |
| 4,912,087 A | 3/1990 | Aslam et al. |
| 4,928,154 A | 5/1990 | Umeno et al. |
| 4,934,777 A | 6/1990 | Jou et al. |
| 4,952,420 A | 8/1990 | Walters |
| 4,959,702 A | 9/1990 | Moyer et al. |
| 4,963,508 A | 10/1990 | Umeno et al. |
| 4,963,949 A | 10/1990 | Wanlass et al. |
| 4,965,649 A | 10/1990 | Zanio et al. |
| 4,981,714 A | 1/1991 | Ohno et al. |
| 4,984,043 A | 1/1991 | Vinal |
| 4,999,842 A | 3/1991 | Huang et al. |
| 5,018,816 A | 5/1991 | Murray et al. |
| 5,028,976 A | 7/1991 | Ozaki et al. |
| 5,051,790 A | 9/1991 | Hammer |
| 5,053,835 A | 10/1991 | Horikawa et al. |
| 5,055,445 A | 10/1991 | Belt et al. |
| 5,055,835 A | 10/1991 | Sutton |
| 5,060,031 A | 10/1991 | Abrokwah et al. |
| 5,063,081 A | 11/1991 | Cozzette et al. |
| 5,063,166 A | 11/1991 | Mooney et al. |
| 5,064,781 A | 11/1991 | Cambou et al. |
| 5,067,809 A | 11/1991 | Tsubota |
| 5,073,981 A | 12/1991 | Giles et al. |
| 5,075,743 A | 12/1991 | Behfar-Rad |
| 5,081,062 A | 1/1992 | Vasudev et al. |
| 5,081,519 A | 1/1992 | Nishimura et al. |
| 5,103,494 A | 4/1992 | Mozer |
| 5,116,461 A | 5/1992 | Lebby et al. |
| 5,119,448 A | 6/1992 | Schaefer et al. |
| 5,122,679 A | 6/1992 | Ishii et al. |
| 5,122,852 A | 6/1992 | Chan et al. |
| 5,127,067 A | 6/1992 | Delcoco et al. |
| 5,130,762 A | 7/1992 | Kulick |
| 5,132,648 A | 7/1992 | Trinh et al. |
| 5,140,651 A | 8/1992 | Soref et al. |
| 5,141,894 A | 8/1992 | Bisaro et al. |
| 5,143,854 A | 9/1992 | Pirrung et al. |
| 5,144,409 A | 9/1992 | Ma |
| 5,155,658 A | 10/1992 | Inam et al. |
| 5,159,413 A | 10/1992 | Calviello et al. |
| 5,163,118 A | 11/1992 | Lorenzo et al. |
| 5,166,761 A | 11/1992 | Olson et al. |
| 5,173,474 A | 12/1992 | Connell et al. |
| 5,173,835 A | 12/1992 | Cornett et al. |
| 5,181,085 A | 1/1993 | Moon et al. |
| 5,185,589 A | 2/1993 | Krishnaswamy et al. |
| 5,188,976 A | 2/1993 | Kume et al. |
| 5,191,625 A | 3/1993 | Gustavsson |
| 5,194,397 A | 3/1993 | Cook et al. |
| 5,194,917 A | 3/1993 | Regener |
| 5,198,269 A | 3/1993 | Swartz et al. |
| 5,208,182 A | 5/1993 | Narayan et al. |
| 5,210,763 A | 5/1993 | Lewis et al. |
| 5,216,729 A | 6/1993 | Berger et al. |
| 5,221,367 A | 6/1993 | Chisholm et al. |
| 5,225,031 A | 7/1993 | McKee et al. |
| 5,227,196 A | 7/1993 | Itoh |
| 5,238,877 A | 8/1993 | Russell |
| 5,244,818 A | 9/1993 | Jokers et al. |
| 5,248,564 A | 9/1993 | Ramesh |
| 5,260,394 A | 11/1993 | Tazaki et al. |
| 5,266,355 A | 11/1993 | Wernberg et al. |
| 5,270,298 A | 12/1993 | Ramesh |
| 5,280,013 A | 1/1994 | Newman et al. |
| 5,281,834 A | 1/1994 | Cambou et al. |
| 5,283,462 A | 2/1994 | Stengel |
| 5,286,985 A | 2/1994 | Taddiken |
| 5,293,050 A | 3/1994 | Chapple-Sokol et al. |
| 5,306,649 A | 4/1994 | Hebert |
| 5,310,707 A | 5/1994 | Oishi et al. |
| 5,312,765 A | 5/1994 | Kanber |
| 5,313,058 A | 5/1994 | Friederich et al. |
| 5,314,547 A | 5/1994 | Heremans et al. |
| 5,315,128 A | 5/1994 | Hunt et al. |
| 5,323,023 A | 6/1994 | Fork |
| 5,326,721 A | 7/1994 | Summerfelt |
| 5,334,556 A | 8/1994 | Guldi |
| 5,341,444 A * | 8/1994 | Henry et al. ............... 385/131 |
| 5,352,926 A | 10/1994 | Andrews |
| 5,356,509 A | 10/1994 | Terranova et al. |
| 5,356,831 A | 10/1994 | Calviello et al. |
| 5,357,122 A | 10/1994 | Okubora et al. |
| 5,358,925 A | 10/1994 | Neville Connell et al. |
| 5,362,998 A | 11/1994 | Iwamura et al. |
| 5,365,477 A | 11/1994 | Cooper, Jr. et al. |
| 5,371,734 A | 12/1994 | Fischer |
| 5,372,992 A | 12/1994 | Itozaki et al. |
| 5,373,166 A | 12/1994 | Buchan et al. |
| 5,387,811 A | 2/1995 | Saigoh |
| 5,391,515 A | 2/1995 | Kao et al. |
| 5,393,352 A | 2/1995 | Summerfelt |
| 5,394,489 A | 2/1995 | Koch |
| 5,395,663 A | 3/1995 | Tabata et al. |
| 5,397,428 A | 3/1995 | Stoner et al. |
| 5,399,898 A | 3/1995 | Rostoker |
| 5,404,581 A | 4/1995 | Honjo |
| 5,405,802 A | 4/1995 | Yamagata et al. |
| 5,406,202 A | 4/1995 | Mehrgardt et al. |
| 5,418,216 A | 5/1995 | Fork |
| 5,418,389 A | 5/1995 | Watanabe |
| 5,420,102 A | 5/1995 | Harshavardhan et al. |
| 5,427,988 A | 6/1995 | Sengupta et al. |
| 5,430,397 A | 7/1995 | Itoh et al. |

| | | | | | |
|---|---|---|---|---|---|
| 5,436,759 A | 7/1995 | Dijaii et al. | 5,659,180 A | 8/1997 | Shen et al. |
| 5,438,584 A | 8/1995 | Paoli et al. | 5,661,112 A | 8/1997 | Hatta et al. |
| 5,441,577 A | 8/1995 | Sasaki et al. | 5,667,586 A | 9/1997 | Ek et al. |
| 5,442,191 A | 8/1995 | Ma | 5,668,048 A | 9/1997 | Kondo et al. |
| 5,442,561 A | 8/1995 | Yoshizawa et al. | 5,670,798 A | 9/1997 | Schetzina |
| 5,444,016 A | 8/1995 | Abrokwah et al. | 5,670,800 A | 9/1997 | Nakao et al. |
| 5,450,812 A | 9/1995 | McKee et al. | 5,674,366 A | 10/1997 | Hayashi et al. |
| 5,452,118 A | 9/1995 | Maruska | 5,679,965 A | 10/1997 | Schetzina |
| 5,453,727 A | 9/1995 | Shibasaki et al. | 5,682,046 A | 10/1997 | Takahashi et al. |
| 5,466,631 A | 11/1995 | Ichikawa et al. | 5,686,741 A | 11/1997 | Ohori et al. |
| 5,473,047 A | 12/1995 | Shi | 5,689,123 A | 11/1997 | Major et al. |
| 5,473,171 A | 12/1995 | Summerfelt | 5,696,392 A | 12/1997 | Char et al. |
| 5,478,653 A | 12/1995 | Guenzer | 5,725,641 A | 3/1998 | MacLeod |
| 5,479,033 A | 12/1995 | Baca et al. | 5,729,394 A | 3/1998 | Sevier et al. |
| 5,479,317 A | 12/1995 | Ramesh | 5,729,641 A | 3/1998 | Chandonnet et al. |
| 5,480,829 A | 1/1996 | Abrokwah et al. | 5,731,220 A | 3/1998 | Tsu et al. |
| 5,481,102 A | 1/1996 | Hazelrigg, Jr. | 5,733,641 A | 3/1998 | Fork et al. |
| 5,482,003 A | 1/1996 | McKee et al. | 5,734,672 A | 3/1998 | McMinn et al. |
| 5,484,664 A | 1/1996 | Kitahara et al. | 5,735,949 A | 4/1998 | Mantl et al. |
| 5,486,406 A | 1/1996 | Shi | 5,741,724 A | 4/1998 | Ramdani et al. |
| 5,491,461 A | 2/1996 | Partin et al. | 5,745,631 A | 4/1998 | Reinker |
| 5,492,859 A | 2/1996 | Sakaguchi et al. | 5,753,300 A | 5/1998 | Wessels et al. |
| 5,494,711 A | 2/1996 | Takeda et al. | 5,753,928 A | 5/1998 | Krause |
| 5,504,035 A | 4/1996 | Rostoker et al. | 5,753,934 A | 5/1998 | Yano et al. |
| 5,504,183 A | 4/1996 | Shi et al. | 5,754,319 A | 5/1998 | Van De Voorde et al. |
| 5,511,238 A | 4/1996 | Bayraktaroglu | 5,754,714 A | 5/1998 | Suzuki et al. |
| 5,512,773 A | 4/1996 | Wolf et al. | 5,760,426 A | 6/1998 | Marx et al. |
| 5,514,484 A | 5/1996 | Nashimoto | 5,760,427 A | 6/1998 | Onda |
| 5,514,904 A | 5/1996 | Onga et al. | 5,760,740 A | 6/1998 | Blodgett |
| 5,515,047 A | 5/1996 | Yamakido et al. | 5,764,676 A | 6/1998 | Paoli et al. |
| 5,515,810 A | 5/1996 | Yamashita et al. | 5,767,543 A | 6/1998 | Ooms et al. |
| 5,516,725 A | 5/1996 | Chang et al. | 5,770,887 A | 6/1998 | Tadatomo et al. |
| 5,519,235 A | 5/1996 | Ramesh | 5,776,359 A | 7/1998 | Schultz et al. |
| 5,523,602 A | 6/1996 | Horiuchi et al. | 5,776,621 A | 7/1998 | Nashimoto |
| 5,528,057 A | 6/1996 | Yanagase et al. | 5,777,350 A | 7/1998 | Nakamura et al. |
| 5,528,067 A | 6/1996 | Farb et al. | 5,777,762 A | 7/1998 | Yamamoto |
| 5,528,414 A | 6/1996 | Oakley | 5,778,018 A | 7/1998 | Yoshikawa et al. |
| 5,530,235 A | 6/1996 | Stefik et al. | 5,778,116 A | 7/1998 | Tomich |
| 5,538,941 A | 7/1996 | Findikoglu et al. | 5,780,311 A | 7/1998 | Beasom et al. |
| 5,540,785 A | 7/1996 | Dennard et al. | 5,789,733 A | 8/1998 | Jachimowicz et al. |
| 5,541,422 A | 7/1996 | Wolf et al. | 5,789,845 A | 8/1998 | Wadaka et al. |
| 5,548,141 A | 8/1996 | Morris et al. | 5,790,583 A | 8/1998 | Ho |
| 5,549,977 A | 8/1996 | Jin et al. | 5,792,569 A | 8/1998 | Sun et al. |
| 5,551,238 A | 9/1996 | Prueitt | 5,792,679 A | 8/1998 | Nakato |
| 5,552,547 A | 9/1996 | Shi | 5,796,648 A | 8/1998 | Kawakubo et al. |
| 5,553,089 A | 9/1996 | Seki et al. | 5,801,072 A | 9/1998 | Barber |
| 5,556,463 A | 9/1996 | Guenzer | 5,801,105 A | 9/1998 | Yano et al. |
| 5,561,305 A | 10/1996 | Smith | 5,807,440 A | 9/1998 | Kubota et al. |
| 5,569,953 A | 10/1996 | Kikkawa et al. | 5,810,923 A | 9/1998 | Yano et al. |
| 5,572,052 A | 11/1996 | Kashihara et al. | 5,812,272 A | 9/1998 | King et al. |
| 5,574,744 A | 11/1996 | Gaw et al. | 5,814,583 A | 9/1998 | Itozaki et al. |
| 5,576,879 A | 11/1996 | Nashimoto | 5,825,055 A | 10/1998 | Summerfelt |
| 5,588,995 A | 12/1996 | Sheldon | 5,825,799 A | 10/1998 | Ho et al. |
| 5,589,284 A | 12/1996 | Summerfelt et al. | 5,827,755 A | 10/1998 | Yonchara et al. |
| 5,596,205 A | 1/1997 | Reedy et al. | 5,828,080 A | 10/1998 | Yano et al. |
| 5,596,214 A | 1/1997 | Endo | 5,830,270 A | 11/1998 | McKee et al. |
| 5,602,418 A | 2/1997 | Imai et al. | 5,833,603 A | 11/1998 | Kovacs et al. |
| 5,603,764 A | 2/1997 | Matsuda et al. | 5,834,362 A | 11/1998 | Miyagaki et al. |
| 5,606,184 A | 2/1997 | Abrokwah et al. | 5,838,035 A | 11/1998 | Ramesh |
| 5,608,046 A | 3/1997 | Cook et al. | 5,844,260 A | 12/1998 | Ohori |
| 5,610,744 A | 3/1997 | Ho et al. | 5,846,846 A | 12/1998 | Suh et al. |
| 5,614,739 A | 3/1997 | Abrokwah et al. | 5,852,687 A | 12/1998 | Wickham |
| 5,619,051 A | 4/1997 | Endo | 5,857,049 A | 1/1999 | Beranek et al. |
| 5,621,227 A | 4/1997 | Joshi | 5,858,814 A | 1/1999 | Goossen et al. |
| 5,623,439 A | 4/1997 | Gotoh et al. | 5,861,966 A | 1/1999 | Ortel |
| 5,623,552 A | 4/1997 | Lane | 5,863,326 A | 1/1999 | Nause et al. |
| 5,629,534 A | 5/1997 | Inuzuka et al. | 5,869,845 A | 2/1999 | Vander Wagt et al. |
| 5,633,724 A | 5/1997 | King et al. | 5,872,493 A | 2/1999 | Ella |
| 5,635,433 A | 6/1997 | Sengupta | 5,873,977 A | 2/1999 | Desu et al. |
| 5,640,267 A | 6/1997 | May et al. | 5,874,860 A | 2/1999 | Brunel et al. |
| 5,642,371 A | 6/1997 | Tohyama et al. | 5,879,956 A | 3/1999 | Seon et al. |
| 5,650,646 A | 7/1997 | Summerfelt | 5,880,452 A | 3/1999 | Plesko |
| 5,656,382 A | 8/1997 | Nashimoto | 5,883,564 A | 3/1999 | Partin |

| | | | | | | |
|---|---|---|---|---|---|---|
| 5,883,996 | A | 3/1999 | Knapp et al. | 6,121,647 A | 9/2000 | Yano et al. |
| 5,886,867 | A | 3/1999 | Chivukula et al. | 6,128,178 A | 10/2000 | Newns |
| 5,888,296 | A | 3/1999 | Ooms et al. | 6,134,114 A | 10/2000 | Ungermann et al. |
| 5,889,296 | A | 3/1999 | Imamura et al. | 6,136,666 A | 10/2000 | So |
| 5,896,476 | A | 4/1999 | Wisseman et al. | 6,137,603 A | 10/2000 | Henmi |
| 5,907,792 | A | 5/1999 | Droopad et al. | 6,139,483 A | 10/2000 | Seabaugh et al. |
| 5,912,068 | A | 6/1999 | Jia | 6,140,746 A | 10/2000 | Miyashita et al. |
| 5,919,515 | A | 7/1999 | Yano et al. | 6,143,072 A | 11/2000 | McKee et al. |
| 5,919,522 | A | 7/1999 | Baum et al. | 6,143,366 A | 11/2000 | Lu |
| 5,926,493 | A | 7/1999 | O'Brien et al. | 6,146,906 A | 11/2000 | Inoue et al. |
| 5,926,496 | A | 7/1999 | Ho et al. | 6,150,239 A | 11/2000 | Goesele et al. |
| 5,937,274 | A | 8/1999 | Kondow et al. | 6,151,240 A | 11/2000 | Suzuki |
| 5,937,285 | A | 8/1999 | Abrokwah et al. | 6,153,010 A | 11/2000 | Kiyoku et al. |
| 5,948,161 | A | 9/1999 | Kizuki | 6,153,454 A | 11/2000 | Krivokapic |
| 5,953,468 | A | 9/1999 | Finnila et al. | 6,156,581 A | 12/2000 | Vaudo et al. |
| 5,955,591 | A | 9/1999 | Imbach et al. | 6,173,474 B1 | 1/2001 | Conrad |
| 5,959,879 | A | 9/1999 | Koo | 6,174,755 B1 | 1/2001 | Manning |
| 5,962,069 | A | 10/1999 | Schindler et al. | 6,175,497 B1 | 1/2001 | Tseng et al. |
| 5,963,291 | A | 10/1999 | Wu et al. | 6,175,555 B1 | 1/2001 | Hoole |
| 5,966,323 | A | 10/1999 | Chen et al. | 6,180,252 B1 | 1/2001 | Farrell et al. |
| 5,977,567 | A | 11/1999 | Verdiell | 6,180,486 B1 | 1/2001 | Leobandung et al. |
| 5,981,400 | A | 11/1999 | Lo | 6,181,920 B1 | 1/2001 | Dent et al. |
| 5,981,976 | A | 11/1999 | Murasato | 6,184,044 B1 | 2/2001 | Sone et al. |
| 5,981,980 | A | 11/1999 | Miyajima et al. | 6,184,144 B1 | 2/2001 | Lo |
| 5,984,190 | A | 11/1999 | Nevill | 6,191,011 B1 | 2/2001 | Gilboa et al. |
| 5,985,404 | A | 11/1999 | Yano et al. | 6,194,753 B1 | 2/2001 | Seon et al. |
| 5,986,301 | A | 11/1999 | Fukushima et al. | 6,197,503 B1 | 3/2001 | Vo-Dinh et al. |
| 5,987,011 | A | 11/1999 | Toh | 6,204,525 B1 | 3/2001 | Sakurai et al. |
| 5,990,495 | A | 11/1999 | Ohba | 6,204,737 B1 | 3/2001 | Ella |
| 5,995,359 | A | 11/1999 | Klee et al. | 6,208,453 B1 | 3/2001 | Wessels et al. |
| 5,995,528 | A | 11/1999 | Fukunaga et al. | 6,210,988 B1 | 4/2001 | Howe et al. |
| 5,997,638 | A | 12/1999 | Copel et al. | 6,211,096 B1 | 4/2001 | Allman et al. |
| 6,002,375 | A | 12/1999 | Corman et al. | 6,222,654 B1 | 4/2001 | Frigo |
| 6,008,762 | A | 12/1999 | Nghiem | 6,224,669 B1 | 5/2001 | Yi et al. |
| 6,011,641 | A | 1/2000 | Shin et al. | 6,225,051 B1 | 5/2001 | Sugiyama et al. |
| 6,011,646 | A | 1/2000 | Mirkarimi et al. | 6,229,159 B1 | 5/2001 | Suzuki |
| 6,013,553 | A | 1/2000 | Wallace et al. | 6,232,242 B1 | 5/2001 | Hata et al. |
| 6,020,222 | A | 2/2000 | Wollesen | 6,232,806 B1 | 5/2001 | Woeste et al. |
| 6,022,140 | A | 2/2000 | Fraden et al. | 6,232,910 B1 | 5/2001 | Bell et al. |
| 6,022,410 | A | 2/2000 | Yu et al. | 6,233,435 B1 | 5/2001 | Wong |
| 6,022,671 | A | 2/2000 | Binkley et al. | 6,235,145 B1 | 5/2001 | Li et al. |
| 6,022,963 | A | 2/2000 | McGall et al. | 6,238,946 B1 | 5/2001 | Ziegler |
| 6,023,082 | A | 2/2000 | McKee et al. | 6,239,449 B1 | 5/2001 | Fafard et al. |
| 6,028,853 | A | 2/2000 | Haartsen | 6,253,649 B1 | 5/2001 | Kawahara et al. |
| 6,039,803 | A | 3/2000 | Fitzgerald et al. | 6,241,821 B1 | 6/2001 | Yu et al. |
| 6,045,626 | A | 4/2000 | Yano et al. | 6,242,686 B1 | 6/2001 | Kishimoto et al. |
| 6,046,464 | A | 4/2000 | Schetzina | 6,248,459 B1 | 6/2001 | Wang et al. |
| 6,048,751 | A | 4/2000 | D'Asaro et al. | 6,248,621 B1 | 6/2001 | Wilk et al. |
| 6,049,702 | A | 4/2000 | Tham et al. | 6,252,261 B1 | 6/2001 | Usui et al. |
| 6,051,858 | A | 4/2000 | Uchida et al. | 6,255,198 B1 | 7/2001 | Linthicum et al. |
| 6,051,874 | A | 4/2000 | Masuda | 6,256,426 B1 | 7/2001 | Duchet |
| 6,055,179 | A | 4/2000 | Koganei et al. | 6,256,441 B1 * | 7/2001 | Ogawa ................. 385/129 |
| 6,058,131 | A | 5/2000 | Pan | 6,265,749 B1 | 7/2001 | Gardner et al. |
| 6,059,895 | A | 5/2000 | Chu et al. | 6,268,269 B1 | 7/2001 | Lee et al. |
| 6,064,078 | A | 5/2000 | Northrup et al. | 6,271,619 B1 | 8/2001 | Yamada et al. |
| 6,064,092 | A | 5/2000 | Park | 6,275,122 B1 | 8/2001 | Speidell et al. |
| 6,078,717 | A | 6/2000 | Nashimoto et al. | 6,277,436 B1 | 8/2001 | Stauf et al. |
| 6,087,681 | A | 6/2000 | Shakuda | 6,278,137 B1 | 8/2001 | Shimoyama et al. |
| 6,083,697 | A | 7/2000 | Beecher et al. | 6,278,138 B1 | 8/2001 | Suzuki |
| 6,088,216 | A | 7/2000 | Laibowitz et al. | 6,278,523 B1 | 8/2001 | Gorecki |
| 6,090,659 | A | 7/2000 | Laibowitz et al. | 6,278,541 B1 | 8/2001 | Baker |
| 6,093,302 | A | 7/2000 | Montgomery | 6,291,319 B1 | 9/2001 | Yu et al. |
| 6,096,584 | A | 8/2000 | Ellis-Monaghan et al. | 6,291,866 B1 | 9/2001 | Wallace |
| 6,100,578 | A | 8/2000 | Suzuki | 6,297,842 B1 | 10/2001 | Koizumi et al. |
| 6,103,008 | A | 8/2000 | McKee et al. | 6,300,615 B1 | 10/2001 | Shinohara et al. |
| 6,103,403 | A | 8/2000 | Grigorian et al. | 6,306,668 B1 | 10/2001 | McKee et al. |
| 6,107,653 | A | 8/2000 | Fitzgerald | 6,307,996 B1 | 10/2001 | Nashimoto et al. |
| 6,107,721 | A | 8/2000 | Lakin | 6,312,819 B1 | 11/2001 | Jia et al. |
| 6,108,125 | A | 8/2000 | Yano | 6,313,486 B1 | 11/2001 | Kencke et al. |
| 6,110,840 | A | 8/2000 | Yu | 6,316,785 B1 | 11/2001 | Nunoue et al. |
| 6,113,690 | A | 9/2000 | Yu et al. | 6,316,832 B1 | 11/2001 | Tsuzuki et al. |
| 6,114,996 | A | 9/2000 | Nghiem | 6,319,730 B1 | 11/2001 | Ramdani et al. |
| 6,121,642 | A | 9/2000 | Newns | 6,320,238 B1 | 11/2001 | Kizilyalli et al. |

| | | | | | | |
|---|---|---|---|---|---|---|
| 6,326,637 | B1 | 12/2001 | Parkin et al. | EP | 0 494 514 | 7/1992 |
| 6,326,645 | B1 | 12/2001 | Kadota | EP | 0 514 018 | 11/1992 |
| 6,326,667 | B1 | 12/2001 | Sugiyama et al. | EP | 0 538 611 | 4/1993 |
| 6,329,277 | B1 | 12/2001 | Liu et al. | EP | 0 581 239 | 2/1994 |
| 6,338,756 | B1 | 1/2002 | Dietze | EP | 0 602 568 | 6/1994 |
| 6,339,664 | B1 | 1/2002 | Farjady et al. | EP | 0 607 435 | 7/1994 |
| 6,340,788 | B1 | 1/2002 | King et al. | EP | 0 630 057 | 12/1994 |
| 6,341,851 | B1 | 1/2002 | Takayama et al. | EP | 0 682 266 | 11/1995 |
| 6,343,171 | B1 | 1/2002 | Yoshimura et al. | EP | 0 711 853 | 5/1996 |
| 6,345,424 | B1 | 2/2002 | Hasegawa et al. | EP | 0 766 292 | 4/1997 |
| 6,348,373 | B1 | 2/2002 | Ma et al. | EP | 0 777 379 | 6/1997 |
| 6,359,330 | B1 | 3/2002 | Goudard | EP | 0 810 666 | 12/1997 |
| 6,362,017 | B1 | 3/2002 | Manabe et al. | EP | 0 828 287 | 3/1998 |
| 6,362,558 | B1 | 3/2002 | Fukui | EP | 0 875 922 | 11/1998 |
| 6,367,699 | B1 | 4/2002 | Ackley | EP | 0 881 669 | 12/1998 |
| 6,372,356 | B1 | 4/2002 | Thornton et al. | EP | 0 884 767 | 12/1998 |
| 6,372,813 | B1 | 4/2002 | Johnson et al. | EP | 0 926 739 | 6/1999 |
| 6,389,209 | B1 | 5/2002 | Suhir | EP | 0 957 522 | 11/1999 |
| 6,391,674 | B1 | 5/2002 | Ziegler | EP | 0 964 259 | 12/1999 |
| 6,392,257 | B1 | 5/2002 | Ramdani et al. | EP | 0 964 453 | 12/1999 |
| 6,393,167 | B1 | 5/2002 | Davis et al. | EP | 0 993 027 | 4/2000 |
| 6,404,027 | B1 | 6/2002 | Hong et al. | EP | 0 999 600 | 5/2000 |
| 6,410,941 | B1 | 6/2002 | Taylor et al. | EP | 1 001 468 | 5/2000 |
| 6,410,947 | B1 | 6/2002 | Wada | EP | 1 037 272 | 9/2000 |
| 6,411,756 | B1 | 6/2002 | Sadot et al. | EP | 1 043 426 | 10/2000 |
| 6,415,140 | B1 | 7/2002 | Benjamin et al. | EP | 1 043 427 | 10/2000 |
| 6,417,059 | B1 | 7/2002 | Huang | EP | 1 043 765 | 10/2000 |
| 6,419,849 | B1 | 7/2002 | Qiu et al. | EP | 1 069 605 | 1/2001 |
| 6,427,066 | B1 | 7/2002 | Grube | EP | 1 069 606 | 1/2001 |
| 6,432,546 | B1 | 8/2002 | Ramesh et al. | EP | 1 085 319 | 3/2001 |
| 6,438,281 | B1 | 8/2002 | Tsukamoto et al. | EP | 1 109 212 | 6/2001 |
| 6,445,724 | B1 | 9/2002 | Abeles | EP | 1 176 230 | 1/2002 |
| 6,461,927 | B1 | 10/2002 | Mochizuki et al. | FR | 2 779 843 | 12/1999 |
| 6,462,360 | B1 | 10/2002 | Higgins, Jr. et al. | GB | 1 319 311 | 6/1970 |
| 6,493,497 | B1 * | 12/2002 | Ramdani et al. ............ 385/131 | GB | 2 152 315 | 7/1985 |
| 6,498,358 | B1 | 12/2002 | Lach et al. | GB | 2 335 792 | 9/1999 |
| 6,501,121 | B1 | 12/2002 | Yu et al. | JP | 52-88354 | 7/1977 |
| 6,524,651 | B1 | 2/2003 | Gan et al. | JP | 52-89070 | 7/1977 |
| 6,355,945 | B1 | 3/2003 | Kadota et al. | JP | 52-135684 | 11/1977 |
| 6,528,374 | B1 | 3/2003 | Bojarczuk, Jr. et al. | JP | 54-134554 | 10/1979 |
| 6,538,359 | B1 | 3/2003 | Hiraku et al. | JP | 55-87424 | 7/1980 |
| 6,589,887 | B1 | 7/2003 | Dalton et al. | JP | 58-075868 | 5/1983 |
| 6,678,452 | B1 * | 1/2004 | Bloechl et al. ............ 385/129 | JP | 58-213412 | 12/1983 |
| 2001/0013313 | A1 | 8/2001 | Droopad et al. | JP | 59-044004 | 3/1984 |
| 2001/0055820 | A1 | 12/2001 | Sakurai et al. | JP | 59-073498 | 4/1984 |
| 2002/0006245 | A1 | 1/2002 | Kubota et al. | JP | 59066183 | 4/1984 |
| 2002/0008234 | A1 | 1/2002 | Emrick | JP | 60-161635 | 8/1985 |
| 2002/0021855 | A1 | 2/2002 | Kim | JP | 60-210018 | 10/1985 |
| 2002/0030246 | A1 | 3/2002 | Elsenbeiser et al. | JP | 60-212018 | 10/1985 |
| 2002/0047123 | A1 | 4/2002 | Ramdani et al. | JP | 61-36981 | 2/1986 |
| 2002/0047143 | A1 | 4/2002 | Ramdani et al. | JP | 61-63015 | 4/1986 |
| 2002/0052061 | A1 | 5/2002 | Fitzgerald | JP | 61-108187 | 5/1986 |
| 2002/0072245 | A1 | 6/2002 | Ooms et al. | JP | 63-34994 | 2/1988 |
| 2002/0076878 | A1 | 6/2002 | Wasa et al. | JP | 63-131104 | 6/1988 |
| 2002/0131675 | A1 | 9/2002 | Litvin | JP | 63-198365 | 8/1988 |
| 2002/0179000 | A1 | 12/2002 | Lee et al. | JP | 63-289812 | 11/1988 |
| 2002/0181829 | A1 * | 12/2002 | Margalit et al. ............... 385/14 | JP | 64-50575 | 2/1989 |
| 2004/0151463 | A1 * | 8/2004 | Talin et al. ................. 385/131 | JP | 64-52329 | 2/1989 |
| | | | | JP | 1-102435 | 4/1989 |
| | | FOREIGN PATENT DOCUMENTS | | JP | 1-179411 | 7/1989 |
| | | | | JP | HEI 2-391 | 1/1990 |
| DE | | 197 12 496 | 10/1997 | JP | 02051220 | 2/1990 |
| DE | | 198 29 609 | 1/2000 | JP | 3-41783 | 2/1991 |
| DE | | 100 17 137 | 10/2000 | JP | 03046384 | 2/1991 |
| EP | | 0 247 722 | 12/1987 | JP | 03-188619 | 8/1991 |
| EP | | 0 250 171 | 12/1987 | JP | 5-48072 | 2/1993 |
| EP | | 0 300 499 | 1/1989 | JP | 5-086477 | 4/1993 |
| EP | | 0 309 270 | 3/1989 | JP | 5-152529 | 6/1993 |
| EP | | 0 331 467 | 9/1989 | JP | 05150143 | 6/1993 |
| EP | | 0 342 937 | 11/1989 | JP | 5-238894 | 9/1993 |
| EP | | 0 392 714 | 10/1990 | JP | 5-291299 | 11/1993 |
| EP | | 0 455 526 | 6/1991 | JP | 06-069490 | 3/1994 |
| EP | | 0 483 993 | 5/1992 | JP | 6-232126 | 8/1994 |

| | | |
|---|---|---|
| JP | 6-291299 | 10/1994 |
| JP | 6-334168 | 12/1994 |
| JP | 0812494 | 1/1996 |
| JP | 9-67193 | 3/1997 |
| JP | 9-82913 | 3/1997 |
| JP | 10-256154 | 9/1998 |
| JP | 10-269842 | 10/1998 |
| JP | 10-303396 | 11/1998 |
| JP | 10-321943 | 12/1998 |
| JP | 11135614 | 5/1999 |
| JP | 11-238683 | 8/1999 |
| JP | 11-260835 | 9/1999 |
| JP | 11340542 | 12/1999 |
| JP | 2000-068466 | 3/2000 |
| JP | 2 000 1645 | 6/2000 |
| JP | 2000-278085 | 10/2000 |
| JP | 2000-351692 | 12/2000 |
| JP | 2001-196895 | 7/2001 |
| JP | 2002-9366 | 1/2002 |
| WO | WO 92/10875 | 6/1992 |
| WO | WO 93/07647 | 4/1993 |
| WO | WO 94/03908 | 2/1994 |
| WO | WO 95/02904 | 1/1995 |
| WO | WO 97/45827 | 12/1997 |
| WO | WO 98/05807 | 1/1998 |
| WO | WO 98/20606 | 5/1998 |
| WO | WO 99/14797 | 3/1999 |
| WO | WO 99/14804 | 3/1999 |
| WO | WO 99/19546 | 4/1999 |
| WO | WO 99/63580 | 12/1999 |
| WO | WO 99/67882 | 12/1999 |
| WO | WO 00/06812 | 2/2000 |
| WO | WO 00/16378 | 3/2000 |
| WO | WO 00/33363 | 6/2000 |
| WO | WO 00/48239 | 8/2000 |
| WO | WO 01/04943 A1 | 1/2001 |
| WO | WO 01/16395 | 3/2001 |
| WO | WO 01/33585 | 5/2001 |
| WO | WO 01/37330 | 5/2001 |
| WO | WO 01/59814 A2 | 8/2001 |
| WO | WO 01/59820 A1 | 8/2001 |
| WO | WO 01/59821 A1 | 8/2001 |
| WO | WO 02 01648 | 1/2002 |
| WO | WO 02/03113 | 1/2002 |
| WO | WO 02/03467 | 1/2002 |
| WO | WO 02/03480 | 1/2002 |
| WO | WO 02/009150 | 1/2002 |
| WO | WO 02/09160 A2 | 1/2002 |
| WO | WO 02/11254 | 2/2002 |
| WO | WO 02/33385 A2 | 4/2002 |
| WO | WO 02/47127 A2 | 6/2002 |
| WO | WO 02/50879 | 6/2002 |
| WO | WO 02/099885 | 12/2002 |
| WO | WO 03/012874 | 2/2003 |

OTHER PUBLICATIONS

"Motorola Develops New Super-Fast Chip"; USA Today; Sep. 4, 2001.

Lori Valigra; "Motorola Lays GaAs on Si Wafer"; AsiaBizTech; Nov. 2001pp. 1-3.

"Holy Grail! Motorola Claims High-Yield GaAs Breakthrough"; Micromagazine.com (no date available); pp. 1-3.

Jong-Gui Yoon; "Growth of Ferroelectric LiNbO3 Thin Film on MgO-Buffered Si by the Sol-Gel Method"; Journal of the Korean Physical Society (Proc. Suppl.); vol. 29, Nov. 1996; pp. S648-S651.

V. Bornand et al.; "Desposition of LiTaO3 thin films by pyrosol process"; Thin Solid Films 304 (1997); pp. 239-244.

R. Droopad et al.; "Development of high dielectric constant epitaxial oxides on silicon by molecular beam epitaxy"; Materials Science and Engineering B87 (2001); pp. 292-296.

A.K. Sharma et al.; "Integration of Pb(Zr0.52Ti0.48)O3 epilayers with Si by domain epitaxy"; Applied Physics Letters, vol. 76, No. 11; Mar. 13, 2000; pp. 1458-1460.

Dwight C. Streit et al; "High Reliability GaAs-AlGaAs HBT's by MBE with Be Base Doping and InGaAs Emitter Contacts"; 8179 Ieee Electron Device Letters; 12(1991) Sep., No. 9, New York, US.

C. Y. Hung et al; "Piezoelectrically induced stress tuning of electro-optic devices"; 320 Applied Physics Letters; 59 (1991) Dec. 30, No. 27, New York, US.

J. Piprek; "Heat Flow Analysis of Long-Wvelength VCSELs with Various DBR Materials"; University of Delaware, Materials Science, Newark, DE, 19716-3106; Oct. 31, 1994; pp. 286-287.

P. Mackowiak et al.; "Some aspects of designing an efficient nitride VCSEL resonator"; J. Phys. D: Appl. Phys. 34(2001); pp. 954-958.

M.R. Wilson et al.; GaAs-On-Si: A GaAs IC Manufacturer's Perspective; GaAs IC Symposium, IEEE, 1988; pp. 243-246.

Y. Kitano et al.; "Thin Film crystal growth of BaZrO3 at low oxygen partial pressure"; Journal of Crystal Growth 243 (2002); pp. 164-169.

M.E. Hawley; et al; "Microstructural Study of Colossal Magneto-Resistive Films As a Function of Growth Temperature, As Deposited and Annealed"; 401, 1996; pp. 531-536.

Nakagawara et al., Effects of Buffer Layers in Epitaxlal Growth of SrTiO$_3$ Thin Film on Si(100), *J. Appl. Phys.*, 78 (12), Dec. 15, 1995, pp. 7226-7230.

Suzuki et al., "A Proposal of Epitaxial Oxide Thin Film Structures For Future Oxide Electronics," *Materials Science and Engineering B41*, (1996), pp. 166-173.

W. F. Egelhoff et al., "Optimizing GMR Spin Valves: The Outlook for Improved Properties", *1998 Int'l Non Volatile Memory Technology Conference*, pp. 34-37.

Wang et al., "Processing and Performance of Piezoelectric Films", Univ. Of MD, Wilcoxon Research Col, and Motorola Labs, May 11, 2000.

M. Rotter et al., "Nonlinear Accustoelectric Interactions in GaAs/LiNbO$_3$ Structures", *Applied Physics Letters*, vol. 75(7), Aug. 16, 1999, pp. 965-967.

K. Sreenivas et al., "Surface Acoustic Wave Propagation on Lead Zirconate Titanate Thin Films," *Appl. Phys. Lett.* 52 (9), Feb. 29, 1998, pp. 709-711.

M. Rotter et al., "Single Chip Fused Hybrids for Acousto-Electric and Acousto-Optic Applications," *1997 Applied Physics Letters*, vol. 70(16), Apr. 21, 1997, pp. 2097-2099.

A. Mansingh et al., "Surface Acoustic Wave Propagation in PZT/YBCO/SrTiO$_3$ and PbTiO$_3$/YBCO/SrTIO$_3$ Epitaxial Heterostructures," *Ferroelectric*, vol. 224, pp. 275-282, 1999.

S. Mathews et al., "Ferroelectric Field Effect Transistor Based on Epitaxial Perovskite Heterostructures", Science, vol. 276, Apr. 11, 1997, pp. 238-240.

R. Houdre et al., "Properties of GaAs on Si Grown by Molecular Beam Epitaxy," *Solid State and Materials Science*, vol. 16, Issue 2, 1990, pp. 91-114.

S. F. Fang et al., "Gallium Arsenide and Other Compound Semiconductors on Silicon," *J. Appl. Phys.*, 68(7), Oct. 1, 1990, pp. R31-R58.

Carlin et al., Impact of GaAs Buffer Thickness on Electronic Quality of GaAs Grown on Graded Ge/GeSi/Si Substrates,

*Appl. Phys. Letter*, vol. 76, No. 14, Apr. 2000, pp. 1884-1886.

Ringel et al., "Epitaxial Integration of III-V Materials and Devices with Si Using Graded GeSi Buffers," 27th International Symposium on Compound Semiconductors, Oct. 2000.

Zogg et al., "Progress In Compound-Semiconductor-on-Silicon-Heteroepitaxy with Fluoride Buffer Layers," *J. Electrochem Soc.*, vol. 136, No. 3, Mar. 1998. pp. 775-779.

Xiong et al., "Oxide Defined GaAs Vertical-Cavity Surface-Emitting Lasers on Si Substrates," *IEEE Photonics Technology Letters*, vol. 12, No. 2, Feb. 2000, pp. 110-112.

Clem et al., "Investigation of PZT//LSCO//Pt//Aerogel Thin Film Composites for Uncooled Pyroelectric IR Detectors," *Mat. Res. Soc. Symp. Proc.*, vol. 541, pp. 661-666, 1999.

Gunapala et al., "Bound-To-Quasi-Bound Quantum-Well Infrared Photodetectors," NASA Tech Brief, vol. 22, No. 9, Sep. 1998.

Abhay M. Joshi et al., "Monolithic InGaAs-on-silicon Wave Infrared Detector Arrays," *Intn. Society for Optical Engineering*, vol. 2999, pp. 211-224.

Bruley et al., "Nanostructure and Chemistry of a (100)MgO/(100) GaAs Interface," *Appl. Phys. Lett*, 65(5), Aug. 1994, pp. 564-566.

Fork et al., "Epitaxial MgO On Si(001) for Y-Ba-Cu-O Thin Film Growth by Pulsed Laser Deposition," *Appl. Phys Lett.*, 58(20), May 20, 1991, pp. 2294-2296.

Himpsel et al., "Dialectrics on Semiconductors," *Materials Science and Engineering*, B1(1988), pp. 9-13.

Li et al., "Epitaxial La $_{0.67}$Sr$_{0.33}$MnO$_3$ Magnetic Tunnel Junctions," *J. Appl. Phys*. 81(8), Apr. 15, 1997, pp. 5509-5511.

O'Donnell et al., "Colossal Magnetoresistance Magnetic Tunnel Junctions Grown by Molecular-Beam Epitaxy," *Appl. Physics Letters*, vol. 76, No. 14, Apr. 3, 2000, pp. 1914-1916.

Mikami et al., "Formation of Si Epi/MgO-Al$_2$O$_3$Epi./SiO$_3$/Si and Its Epitaxial Film Quality," Fundamental Research Laboratories and Microelectronics Laboratories, pp. 31-34, 1983.

T. Asano et al., "An Epitaxial Si/Insulator/Si Structure Prepared by Vacuum Deposition of CaF$_2$ and Silicon," *Thin Solid Films*, vol. 93 (1982), pp. 143-150.

T. Chikyow et al., "Reaction and Regrowth Control of CeO$_2$on Si(111) Surface for the Silicon-On-Insulator Structure," *Appl. Phys. Lett.*, vol. 65, No. 8, Aug. 22, 1994, pp. 1030-1032.

J.F. Kang, et al., "Epitaxial Growth of CeO$_2$(100) Films on Si(100) Substrates by Dual Ion Beams Reactive Sputtering," *Solid State Communications*, vol. 108, No. 4, pp. 225-227, 1998.

R.A. Morgan et al., "Vertical-Cavity Surface-Emitting Lasers Come of Age," *SPIE*, vol. 2683, pp. 18-29.

"Technical Analysis of Qualcomm QCP-800 Portable Cellular Phone (Transmitter Circuitry)," Talus Corporation, Qualcomm QCP-800 Technical Analysis Report, Dec. 10, 1996, pp. 5-8.

Jo-Ey Wong, et al.; "An Electrostatically-Actuated Mems Switch for Power Applications"; IEEE, 2000; pp. 633-638.

T. Mizuno, et al.; "Electron and Hole Mobility Enhancement in Strained-Si MOSFET's on SiGe-on-Insulator Substrates Fabricated by SIMOX Technology"; IEEE Electron Device Letters, vol. 21, No. 5, May 2000; pp. 230-232.

F.M. Buffer, et al.; "Strain-dependence of electron transport in bulk Si and deep-submicron MOSFET's" Computatural Electronics, 2000, Book of Abstracts, IWCE Glasgow 2000, 7th Int'l Workshop on, 2000; pp. 64-65.

S.S. Lu, et al.; "Piezoelectric field effect transistor (PEFET) using In$_{0.2}$Ga$_{0.6}$As/Al$_{0.35}$Ga$_{0.65}$As/In$_{0.2}$Ga$_{0.6}$As/GaAs Strained layer structure on (111)B GaAs substrate"; Electronics Letters, 12$^{TH}$ Ma 1994, vol. 30, No. 10; pp. 823-825.

Kihong Kim, et al." On-Chip Wireless Interconnection with Integrated Antennas"; 2000 IEEE; pp. 20.2.1-20.3.4.

G. Passiopoulos, et al.; "V-Band Single Chip, Direct Carrier BPSK Modulation Transmitter With Integrated Patch Antenna"; 1998 IEEE MTT-S Digest; pp. 305-308.

Mau-Chung Frank Chang, et al.; "RF/Wireless Interconnect for Inter- and Intra-Chip Communications"; Proceedings of the IEEE, vol. 89, No. 4, Apr. 2001; pp. 456-466.

The Electronics Industry Report; Prismark; 2001; pp. 111-120.

J.K. Abrokwah, et al.; "A Manufacturable Complementary GaAs Process"; GaAs IC Symposium, IEEE, 1993; pp. 127-130.

H. Nagata, "A Preliminary Consideration of the Growth Behaviour of CeO$_2$, SrTiO$_3$ and SrVO$_3$ Films on Si Substrate," *Thin Solid Films*, 224, 1993, pp. 1-3.

Nagata et al., "Heteroepitaxial Growth of CeO$_2$(001) Films on Si(001) Substrates by Pulsed Laser Deposition in Ultrahigh Vacuum," *Jpn. Jour. Appl. Phys.*, vol. 30, No. 6B, Jun. 1991, pp. L1136-L1138.

Kado et al., "Heteroepitaxial Growth of SrO Films on Si Substrates," *J. Appl. Phys.*, 61(6), Mar. 15, 1987, pp. 2398-2400.

H. Ishiwara et al., "Epitaxial Growth of Perovskite Type Oxide Films on Substrates"; *Materials Research Symposium Proceedings*, vol. 220, pp. 595-600, Apr. 29-May 3, 1991.

J.K. Abrokwah, et al.; "A Manufacturable High-Speed Low-Power Complementary GaAs Process"; Extended Abstracts of the 1994 International Conference on Solid State Devices and Materials, Yokohama, 1994, pp. 592-594.

C.J. Palmstrom et al.; "Stable and Epitaxial Contacts to III-V Compound Semiconductors"; Contacts to Semiconductors Fundamentals and Technology; Noyles Publications, 1993; pp. 67-150.

Jayshri Sabarinathat, et al.; "Submicron three-dimensional infrared GaAs/Al$_x$O$_y$-based photonic crystal using single-step epitaxial growth"; Applied Physics Letters, vol. 78, No. 20, May 14, 2001; pp. 3024-3026.

Philip Ball; "The Next Generation of Optical Fibers"; Technology Review, May 2001; pp. 55-61.

John D. Joannopoulos, et al.; "Molding the Flow of Light"; Photonic Crystals; Princeton University Press, 1995.

Thomas F. Krauss, et al.; "Photonic crystals in the optical regime—past, present and future"; Progress in Quantum Electronics 23 (1999) 51-96.

G. H. Jin, et al.; "PLZT Film Waveguide Mach-Zehnder Electrooptic Modulator"; Journal of Lightwave Technology, vol. 18, No. 6. Jun. 2000; pp. 807-812.

D.E. Aspnes, et al.; "Steps on (001) silicon surfaces"; J. Vac. Sci. Technol. B, vol. 5, No. 4, Jul./Aug. 1987; pp. 939-944.

D.M. Newns, et al.; "Mott transition field effect transistor"; Applied Physics Letters, vol. 73, No. 6, Aug. 10, 1998; pp. 780-782.

Lucent Technologies, Inc. "Arrayed Waveguide Grating Multiplexer/Demultiplexer"; Jan. 2000; 4 pages.

Hisashi Shichijo, et al.; "Co-Integration of GaAs MESFET and Si CMOS Circuits"; IEEE Electron Device Letters, vol. 9, No. 9, Sep. 1988; pp. 444-446.

H. Shichijo, et al.; "GaAs MESFET and Si CMOS Cointegration and Circuit Techniques"; 1988 IEEE; GaAs IC Symposium—239-242.

H. Shichijo, et al.; "Monolithic Process for Co-Integration of GaAs and Silicon Circuits"; 1988 IEEE; pp. 778-781.

Z.H. Zhu, et al. "Growth of InGaAs multi-quantum wells at 1.3 m wavelength on GaAs compliant substrates"; Applied Physics Letters, vol. 72, No. 20, May 18, 1998; pp. 2598-2600.

Kurt Eisenbeiser, et al.; "Metamorphic InAlAs/InGaAs Enhancement Mode HEMT's on GaAs Substrates"; IEEE Electron Device Letters, vol. 20, No. 10, Oct. 1999; pp. 507-509.

Tomonori Nagashima, et al.; "Three-Terminal Tandem Solar Cells With a Back-Contact Type Bottom Cell" Higashifuji Technical Center, Toyota Motor Corporation; 4 pages.

James Schellenberg, et al.; "Low-Loss, Planar Monolithic Baluns for K/Ka-Band Applications"; 1999 IEEE MTT-S Digest; pp. 1733-1736.

Arnold Leitner et al; "Pulsed Laser Deposition of Superconducting Strontium Titanate Thin-Films"; ; Session K11-Thin Films and Borocarbides; Mixed Session, Wednesday Afternoon; Mar. 19, 1997; Room 1202 B, Conv. Center (Abstract).

R.D. Vispute; "High quality optoelectronic grade epitaxial AlN films on -$Al_2O_3$, Si and 6H-SiC by pulsed laser deposition"; Thin Solid Films 299 (1997), pp. 94-103.

T. Warren Weeks, et al.; "GaN thin films deposited via organometallic vapor phase epitaxy on (6H)-SiC(0001) using high-temperature monocrystalline AlN buffer layers" 320 Applied Physics Letters, vol. 67, No. 3, Jul. 17, 1995, ppl401-403.

Z. Yu, et al.; "Epitaxial oxide thin films on SI(001)*"; J. Vac. Sci. Technol. B. vol. 18, No. 4, Jul./Aug. 2000; pp. 2139-2145.

Gentex Corporate Website; Photoelectric Smoke Detectors—How They Work; 2001.

Jeffrey B. Casady, et al.; "A Hybrid 6H-SiC Temperature Sensor Operational from 25 C to 500 C"; IEEE Transactions on Components, Packaging, and Manufacturing Technology—Part A, vol. 19, No. 3, Sep. 1996; pp. 416-422.

Ronald W. Waynant, et al.; "Optoelectronic Integrated Circuits"; Electro-Optics Handbook, McGraw-Hill, Inc., 1994; Chapter Twenty Seven.

Antonio Mecozzi, et al.; "The Roles of Semiconductor Optical Amplifiers in Optical Networks"; Optics & Photonics News; Mar. 2001; pp. 37-42.

D.A. Francis, et al.; "A single-chip linear optical amplifier"; OFC, 2001; Mar. 17-22, 2001.

G. Vogg et al.; "Epitaxial alloy films of zinti-phase Ca(Si1-xGex)2"; Journal of Crystal Growth 223 (2001); pp. 573-576.

Peter S. Guilfoyle, et al.; "Optoelectronic Architecture for High-Speed Switching and Processing Applications"; 1998 The Photonics Design and Applications Handbook; pp. H-399-H-406.

Gerald B. Stringfellow; "Organometallic Vapor-Phase Epitaxy: Theory and Practice"; Departments of Materials Science and Engineering and Electrical Engineering, University of Utah; Academic Press, 1989.

M.A. Herman, et al.; "Molecular Beam Epitaxy Fundamentals and Current Status"; Springer-Verlag Berlin Heidelberg, 1989, 1996.

"Integration of GaAs on Si Using a Spinel Buffer Layer", IBM Technical Bulletin, vol. 30, No. 6, Nov. 1987, p. 365.

"GaInAs Superconducting FET,"IBM Technical Bulletin, vol. 36, No. 8, Aug. 1993, p. 655-656.

"Epitaxial 3d Structure Using Mixed Spinels," IBM Technical Bulletin, vol. 30, No. 3, Aug. 1987, p. 1271.

Moon et al., "Roles of Buffer Layers in Epitaxial Growth of $SrTiO_3$ Films on Silicon Substrates," *Japan J of Appl. Phys.*, vol. 33, Mar. 1994, pp. 1472-1477.

Yodo et al., GaAs Heteroepitaxial Growth on Si Substrates with Thin Si Interlayers *in situ* Annealed at High Temperatures, *8257b Journal of Vacuum Science & Technology*, May/Jun. 1995, vol. 13, No. 3, pp. 1000-1005.

Cuomo et al., "Substrate Effect on the Superconductivity of $YBa_2Cu_3O_7$ Thin Films," AIP Conference 1988, pp. 141-148.

McKee et al., "Crystalline Oxides on Silicon: The First Five Monolayers," *Physical Review Letters*, vol. 81, No. 14, Oct. 1998, pp. 3014-3017.

McKee et al., "Molecular Beam Epitaxy Growth of Epitaxial Barium Silicide, Barium Oxide, and Barium Titanate on Silicon," *1991 American Institute of Physics*, pp. 782-784, Aug. 13, 1991.

Tambo et al., Molecular Beam Epitaxy Growth of $SrTiO_3$ Films on Si(100)-2x1 with SrO Buffer Layer, *Jpn. J. Appl. Phys.*, vol. 37, 1998, pp. 4454-4459.

McKee et al., "The MBE Growth and Optical Quality of $BaTiO_3$ and $SrTiO_3$ Thin Films on MgO," *Mat. Res. Soc. Symp. Proc.*, vol. 341, Apr. 1994, pp. 309-314.

McKee et al., "$BaSi_2$ and Thin Film Alkaline Earth Silicides on Silicon," *Appl. Phys. Lett.*, 63 (20), Nov. 1993, pp. 2818-2820.

McKee et al., "Surface Structures and the Orthorhombic Transformation of Thin Film $BaSi_2$ on Silicon," *Mat. Res. Soc. Symp. Proc.*, vol. 221, pp. 131-136.

Brian A. Floyd, et al.; "The projected Power Consumption of a Wireless Clock Distribution System and Comparison to Conventional Distribution Systems"; IEEE, 1999; pp. IITC99-249-IITC99-250.

Mori et al., "Epitaxial Growth of $SrTiO_3$ Films on Si(100) Substrates Using a Focused Electron Beam Evaporation Method," *Jpn. J. of Apl. Phys.*, vol. 30, No. 8A, Aug. 1991, pp. L1415-L1417.

Moon et al., "Growth of Crystalline $SrTiO_3$ Films on Si Substrates Using Thin Fluoride Buffer Layers and Their Electrical Properties," *Jpn. J. of Appl. Phys.*, vol. 33, (1994), pp. 5911-5916.

Farrow et al., "Heteroepitaxy of Dissimilar Materials," *Mat. Res. Soc. Symposium Proceedings*, vol. 221, pp. 29-34, Apr. 29-May 2, 1991.

Ishiwara et al., "Heteroepitaxy on Silicon: Fundamentals, Structure, and Devices," *Mat. Res. Soc.*, Symposium Proceedings, vol. 116, pp. 369-374, Apr. 5-8, 1988.

Douglas B. Chrisey, et al; Pulsed Laser Deposition of Thin Films; pp. 273-285.

B.A. Block, et al; "Photoluminescence properties of $Er^3$-doped $BaTiO_3$ thin films"; Appl. Phys. Lett. 65 (1), Jul. 4, 1994, pp. 25-27.

Kevin J. Chen et al; "A Novel Ultrafast Functional Device: Resonant Tunneling High Electron Mobility Transistor"; Electron Devices Meetingk 1996; IEEE Hong Kong; Jun. 29, 1996; pp. 60-63, XP010210167.

Wenhua Zhu et al.; "Molecular Beam Epitaxy of GaAs on Si-on-Insulator"; 320 Applied Physics Letters 59(1991) Jul. 8 No. 2; pp. 210-212.

Umesh K. Mishra et al; "Oxide Based Compound Semiconductor Electronics"; Electron Devices Meeting;

1997; Technical Digest, International; Washington, D.C.; Dec. 7-10, 1997; pp. 545-548.

J.M. Daughton et al.; "Application of Spin Dependent Transport Materials"; J. Phys. D. Appl. Phys. 32(1999) R169-R177.

Wei Zhang et al.; "Stress Effect and Enhanced Magnetoresistance in $La_{0.67}Ca_{0.33}MnO_{3-\delta}$ Films"; Physical Review, B. Condensed Matter; American Institute of Physics; vol. 58, No. 21, Part 1; Dec. 1, 1998; pp. 14143-14146.

Q.-Y. Tong et al.; "IOS-a new type of materials combination for system-on-a chip preparation"; 1999 IEEE International SOI Conference, Oct. 1999; pp. 104-105.

T. Kanniainen et al.; "Growth of Dielectric 1hfo2/Ta205 Thin Film Nanolaminate Capacitors By Atomic Layer Epitaxy"; Electrochemical Society Proceedings, U.S. Electrochemical Society; Pennington, N.J.; Aug. 31, 1997; pp. 36-46.

Myung Bok Lee; "Heteroepitaxial Growth of $BaTio_3$ Films on Si by Pulsed Laser Deposition"; Applied Physics Letters; Mar. 13, 1995; pp. 1331-1333.

Myung Bok Lee; "Formation and Characterization of Epitaxial $TiO_2$ and $BaTiO_3/TiO_2$ Films on Si Substrate"; Japan Journal Applied Physics Letters; vol. 34; 1995; pp. 808-811.

Gilbert Lecarpentier et al.; "High Accuracy Machine Automated Assembly for Opto Electronics"; 2000 Electronic Components and Technology Conference; pp. 1-4.

R. Ramesh; "Ferroelectric La-Sr-Co-O/Pb-Zr-Ti-O/La-Sr-Co-O Heterostructures on Silicon via Template Growth"; 320 Applied Physics Letters; 63(1993); Dec. 27; No. 26; pp. 3592-3594.

K. Eisenbeiser; "Field Effect Transistors with $SrTiO_3$ Gate Dielectric on Si"; Applied Physics Letters; vol. 76, No. 10; Mar. 6, 2000; pp. 1324-1326.

Stephen A. Mass; "Microwave Mixers"; Second Edition; 2pp.

Douglas J. Hamilton et al.; "Basic Integrated Circuit Engineering"; pp. 2; 1975.

Takeshi Obata; "Tunneling Magnetoresistance at Up to 270 K in $La_{0.8}Sr_{0.2}MnO_3/SrTiO_3/La_{0.8}Sr_{0.2}MnO_3$ Junctions with 1.6-nm-Thick Barriers"; Applied Physics Letters; vol. 74, No. 2; Jan. 11, 1999; pp. 290-292.

Wei Zhang et al; "Enhanced Magnetoresistance in La-Ca-Mn-O Films on Si Substrates Using $YbaCuO/CeO_2$ Heterostructures"; Physica C; vol. 282-287, No. 2003; Aug. 1, 1997; pp. 1231-1232.

Shogo Imada et al; "Epitaxial Growth of Ferroelectric $YmnO_3$ Thin Films on Si(111) Substrates by Molecular Beam Epitaxy"; Jpn. J. Appl. Phys. vol. 37 (1998); pp. 6497-6501; Part 1, No. 12A, Dec. 1998.

Ladislav Pust et al.; "Temperature Dependence of the Magnetization Reversal in Co(fcc)-BN-Co(poly hcp) Structures"; Journal of Applied Physics; vol. 85, No. 8; Apr. 15, 1999; pp. 5765-5767.

C. Martinez; "Epitaxial Metallic Nanostructures on GaAs"; Surface Science; vol. 482-485; pp. 910-915; 2001.

Wen-Ching Shih et al.; "Theoretical Investigation of the SAW Properties of Ferroelectric Film Composite Structures"; IEEE Transactions of Ultrasonics, Ferroelectrics, and Frequency Control; vol. 45, No. 2; Mar. 1998; pp. 305-316.

Zhu Dazhong et al.; "Design of $ZnO/SiO_2/Si$ Monolithic Integrated Programmable SAW Filter"; Proceedings of Fifth International Conference on Solid-State and Integrated Circuit Technology; Oct. 21-23, 1998; pp. 826-829.

Kirk-Othmer Encyclopedia of Chemical Technology; Fourth Edition, vol. 12; Fuel Resources to Heat Stabilizers; A Wiley-Interscience Publication; John Wiley & Sons.

Joseph W. Goodman et al; "Optical Interconnections For VLSI Systems"; Proceedings of the IEEE, vol. 72, No. 7 Jul. 1984.

Fathimulla et al.; "Monolithic Integration of InGaAs/InAlAs MODFETs and RTDs on InP-bonded-to Si Substrate"; Fourth International Conference on Indium Phosphide and Related Materials, Newport, RI, USA; Apr. 21-24, 1992 ; pp. 167-170; XP000341253; IEEE, New York, NY, USA; ISBN: 0-7803-0522-1.

H. Takahashi et al.; "Arrayed-Waveguide Grating For Wavelength Division Multi/Demultiplexer With Nanometre REsolution"; Electronics Letters; vol. 26., No. 2, Jan. 18th, 1990.

Pierret, R.F.; "1/J-FET and MESFET"; Field Effect Devices; MA, Addison-Wesley; 1990; pp. 9-22.

M. Schrelter, et al.; "Sputtering of Self-Polarized PZT Films for IR-Detector Arrays"; 1998 IEEE; pp. 181-185.

Hideaki Adachi et al.; "Sputtering Preparation of Ferroelectric PLZT Thin Films and Their Optical Applications"; IEEE Transactions of Ultrasonics, Ferroelectrics and Frequency Control, vol. 38, No. 6, Nov. 1991.

A.J. Moulson et al.; "Electroceramics Materials Properties Applications"; Chapman & Hall; pp. 366-369.

P.A. Langjahr et al.; "Epitaxial Growth and Structure of Cubic and Pseudocubic Perovskite Films on Pervoskite Substrates"; Mat. Res. Soc. Symp. Proc., vol. 401; 1995 Materials Research Society; pp. 109-114.

Wang et al.; "Depletion-Mode GaAs MOSFETs with Negligible Drain Current Drift and Hysteresis"; Electron Devices Meeting, 1998, IEDM '98 Technical Digest; pp. 67-70.

Ben G. Streetman; "Solid State Electronic Devices"; 1990, Prentice Hall; Third Edition; pp. 320-322.

A.Y Wu et al.; "Highly Oriented $(Pb,La)(Zr,Ti)O_3$ Thin Films on Amorphous Substrates"; IEEE, 1992; pp. 301-304.

Timothy E. Glassman et al.; "Evidence for Cooperative Oxidation of MoCVD Precursors Used in $Ba_xSr_{1-x}TiO_3$ Film Growth"; Mat. Res. Soc. Symp. Proc. vol. 446, 1997 Materials Research Society; pp. 321-326.

S.N. Subbarao et al.; "Monolithic PIN Photodetector and FET Amplifier on GaAs-os-Si"; IEEE; GaAs IC Symposium-163-166; 1989.

T.A. Langdo et al.; "High Quality Ge on Si by Epitaxial Necking"; Applied Physics Letters; vol. 76, No. 25; pp. 3700-3702; Jun. 19, 2000.

Chenning Hu et al.; Solar Cells From Basics to Advanced Systems; McGraw-Hill Book Company; 1983.

O.J. Painter et al; "Room Temperature Photonic Crystal Defect Lasers at Near-Infrared Wavelengths in InGaAsp"; Journal of Lightwave Technology, vol. 17, No. 11; Nov. 1999.

C. Donn et al.; "A 16-Element, K-Band Monolithic Active Receive Phased Array Antenna"; Antennas and Propagation Society International Symposium, 1988; pp. 188-191, vol. 1; Jun. 6-10, 1988.

Don W. Shaw; "Epitaxial GaAs on Si: Progress and Potential Applications"; Mat. Res. Soc. Symp. Proc.; pp. 15-30; 1987.

G.J.M. Dormans, et al.; "$PbTiO/_3$/Thin Films Grown by Organometallic Chemical Vapour Deposition"; Third International Symposium on Integrated Ferroelectrics; Apr. 3-5, 1991 (Abstract).

P.J. Borrelli et al.; "Compositional and Structural Properties of Sputtered PLZT Thin Films"; Ferroelectric Thin Films II Symposium; Dec. 2-4, 1991 (Abstract).

Ranu Nayak et al; "Enhanced acousto-optic diffraction efficiency in a symmetric SrRiO3/BaTiO3/SrTiO3 thin-film heterostructure"; Nov. 1, 2000; vol. 39, No. 31; Applied Optics; pp. 5847-5853.

Ranu Nayak et al; "Studies on acousto-optical interaction in SrTiO3/BaTiO3/SrTiO3 epitaxial thin film heterostructures"; J. Phys. D: Appl. Phys. 32 (1999) 380-387.

S.K. Tewksbury et al.; "CoIntegration of Optoelectronics and Submicron CMOS"; Wafer Scale Integration; 1993; Proceedings, Fifth Annual IEEE; Jan. 20, 1993; pp. 358-367.

V. Kaushik et al.; "Device Characteristics of Crystalline Epitaxial Oxides on Silicon"; Device Research Conference, 2000; Conference Digest 58th DRC; pp. 17-20; Jun. 19-21, 2000.

Katherine Derbyshire; "Prospects Bright for Optoelectronics Volume, Cost Drive Manufacturing for Optical Applications"; Semiconductor Magazine; vol. 3, No. 3; Mar. 2002.

Alex Chediak et al; "Integration of GaAs/Si with Buffer Layers and Its Impact on Device Integration"; TICS 4, Prof. Sands. MSE 225, Apr. 12, 2002; pp. 1-5.

S.A. Chambers et al; "Band Discontinuities at Epitaxial SrTiO3/Si(001) Heterojunctions"; Applied Physics Letters; vol. 77, No. 11; Sep. 11, 2000; pp. 1662-1664.

H. Wang et al.; "GaAs/GaAlAs Power HBTs for Mobile Communications"; Microwave Symposium Digest; 1993 IEEE; vol. 2.; pp. 549-552.

Y. Ota et al.; "Application of Heterojunction FET to Power Amplifier for Cellular Telephone"; Electronics Letters; May 26th, 1994; vol. 30, No. 11; pp. 906-907.

Keiichi Sakuno et al; "A 3.5W HBT MMIC Power Amplifier Module for Mobile Communications"; IEEE 1994; Microwave and Millimeter-Wave Monolithic Circuits Symposium; pp. 63-66.

Mitsubishi Semiconductors Press Release (GaAs FET's) Nov. 8, 1999 pp. 1-2.

R.J. Matyl et al; "Selected Area Heteroepitaxial Growth of GaAs on Silicon for Advanced Device Structures"; 2194 Thin Solid Films; 181 (1989) Dec. 10; No. 1; pp. 213-225.

K. Nashimoto et al; "Patterning of Nb, LaOnZr, TiO3 Waveguides for Fabricating Micro-Optics Using Wet Etching and Solid-Phase Epitaxy"; Applied Physics Letters; vol. 75, No. 8; Aug. 23, 1999; pp. 1054-1056.

Bang-Hung Tsao et al; "Sputtered Barium Titanate and Barium Strontium Titanate Films for Capacitor Applications"; Applications of Ferroelectrics, 2000; Proceedings of the 2000 12th International Symposium on vol. 2; pp. 837-840.

Man Fai Ng et al; "Heteroepitaxial growth of lanthanum aluminate films derived from mixed metal nitrates"; Journal of Materials Research; vol. 12, No. 5; pp. 1306.

Yuji Matsumoto et al.; "Room-Temperature Ferromagnetism in Transparent Transition Metal-Doped Titanium Dioxide"; Science; Feb. 2, 2001; vol. 291; pp. 854-856.

S.A. Chambers et al.; "Epitaxial Growth and Properties of Ferromagnetic Co-Doped TiO2 Anatase"; Applied Physics Letters; vol. 79, No. 21; Nov. 19, 2001; pp. 3467-3469.

J.R. Busch et al.; "Linear Electro-Optic Response in Sol-Gel PZT Planair Waveguides"; Electronics Letters; Aug. 13th, 1992; vol. 28, No. 17; pp. 1591-1592.

Yi W. et al; "Mechanism of cleaning Si (100) surface using Sr and SrO for the growth of crystalline SrTiO/sub 2/films" Journal of Vacuum Science & Technology, vol. 20, No. 4, Jul. 2002 pp. 1402-1405.

Xiaming Hu et al; "Sr/Si template formation for the epitaxial growth of SrTiO/sub 3/on silicon" Materials Research Society Proceedings, vol. 716, 2002, pp. 261-266.

* cited by examiner

OPTICAL WAVEGUIDE STRUCTURE AND METHOD FOR FABRICATING THE SAME

FIELD OF THE INVENTION

This invention relates generally to optical waveguide devices and to a method for their fabrication, and more specifically to optical waveguide devices and to the fabrication and use of optical waveguide devices that include a monocrystalline substrate, an accommodating buffer layer, and an amorphous interface layer formed therebetween, which form a compliant substrate that permits the fabrication of a high quality monocrystalline layers that form an optical waveguide device.

BACKGROUND OF THE INVENTION

Semiconductor devices often include multiple layers of conductive, insulating, and semiconductive layers. Often, the desirable properties of such layers improve with the crystallinity of the layer. For example, light propagation is superior in dielectric films of higher crystalline quality. Similarly, the electron mobility and electron lifetime of semiconductive layers improve as the crystallinity of the layer increases. The free electron concentration of conductive layers and the electron charge displacement and electron energy recoverability of insulative or dielectric films also improve as the crystallinity of these layers increases.

Attempts have been made to fabricate high quality crystalline optical waveguide devices. However, such attempts typically have succeeded only on bulk oxide substrates. Attempts to grow such devices on a single crystal semiconductor or compound semiconductors substrates, such as germanium, silicon, and various insulators, have generally been unsuccessful because crystal lattice mismatches between the host crystal of the substrate and the grown crystal of the optical waveguide layer have caused the resulting crystal of the optical waveguide layer to be of low crystalline quality.

Accordingly, a need exists for a semiconductor structure that provides a high quality optical waveguide and for a process for making such a structure. In other words, there is a need for providing the formation of a monocrystalline substrate that is compliant with a high quality monocrystalline optical waveguide material layer so that true two-dimensional growth can be achieved for the formation of quality optical waveguide devices.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Figure 1:
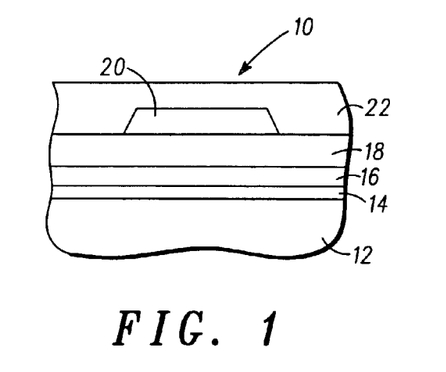
FIGS. 1 and 2 illustrate schematically, in cross section, device structures in accordance with various embodiments of the invention.

FIG. 1 illustrates schematically, in cross section, a portion of an optical waveguide structure 10 in accordance with an embodiment of the invention. Optical waveguide structure 10 comprises a monocrystalline substrate 12, an accommodating buffer layer 16 formed of a monocrystalline material, and a monocrystalline optical waveguide layer 20. In this context, the term "monocrystalline" shall have the meaning commonly used within the semiconductor industry. The term shall refer to materials that are a single crystal or that are substantially a single crystal and shall include those materials having a relatively small number of defects such as dislocations and the like as are commonly found in substrates of silicon or germanium or mixtures of silicon and germanium and epitaxial layers of such materials commonly found in the semiconductor industry.

Structure 10 also includes an amorphous interface layer 14 positioned between substrate 12 and accommodating buffer layer 16. The amorphous interface layer helps to relieve the strain in the accommodating buffer layer and, by doing so, aids in the growth of a high crystalline quality accommodating buffer layer.

Substrate 12, in accordance with an embodiment of the invention, is a monocrystalline semiconductor or compound semiconductor material. The material can be of, for example, a material from Group IV of the periodic table. Examples of Group IV semiconductor materials include silicon, germanium, mixed silicon and germanium, mixed silicon and carbon, mixed silicon, germanium and carbon, and the like. Preferably, substrate 12 is a material containing silicon or germanium, and most preferably is high quality monocrystalline silicon as used in the semiconductor industry. Substrate 12 may also be, for example, silicon-on-insulator (SOI), where a thin layer of silicon is on top of an insulating material such as silicon oxide or glass.

Accommodating buffer layer 16 is preferably a monocrystalline oxide or nitride material selected for its crystalline compatibility with the underlying substrate and with the overlying optical waveguide layer 20. For example, the material could be an oxide or nitride having a lattice structure closely matched to the substrate and to a subsequently applied monocrystalline material layer. Materials that are suitable for the accommodating buffer layer include metal oxides such as the alkaline earth metal titanates, alkaline earth metal zirconates, alkaline earth metal hafnates, alkaline earth metal tantalates, alkaline earth metal ruthenates, alkaline earth metal niobates, alkaline earth metal vanadates, alkaline earth metal tin-based perovskites, lanthanum aluminate, lanthanum scandium oxide, and other perovskite oxide materials, and gadolinium oxide. Additionally, various nitrides such as gallium nitride, aluminum nitride, and boron nitride may also be used for the accommodating buffer layer. Most of these materials are insulators, although strontium ruthenate, for example, is a conductor. Generally, these materials are metal oxides or metal nitrides, and more particularly, these metal oxides or nitrides typically include at least two different metallic elements. In some specific applications, the metal oxides or nitrides may include three or more different metallic elements. Typically, accommodating buffer layer 16 has a thickness of about 2 to about 100 nanometers. Preferably, accommodating buffer layer 16 has a thickness of about 5 nanometers.

In accordance with one embodiment of the invention, amorphous interface layer 14 is grown on substrate 12 at the interface between substrate 12 and the growing accommodating buffer layer by the oxidation of substrate 12 during the growth of layer 16. The amorphous interface layer 14 serves to relieve strain that might otherwise occur in the monocrystalline accommodating buffer layer as a result of differences in the lattice constants of the substrate and the buffer layer. As used herein, lattice constant refers to the distance between atoms of a cell measured in the plane of the surface. If such strain is not relieved by the amorphous interface layer, the strain may cause defects in the crystalline structure of the accommodating buffer layer. Defects in the crystalline structure of the accommodating buffer layer, in turn, would make it difficult to achieve a high quality crystalline structure in an optical waveguide layer that is formed overlying accommodating buffer layer 16, as described in more detail below. Typically, layer 14 has a thickness in the range of approximately 0.5–5 nm.

In another exemplary embodiment of the invention, optical waveguide structure 10 may also comprise a monocrystalline optical buffer layer 18. Monocrystalline optical buffer layer 18 overlies accommodating buffer layer 16 and serves to reduce the optical propagation loss to substrate 12. Optical buffer layer 18 may comprise any suitable monocrystalline dielectric material that has an index of refraction smaller that the material that comprises waveguide layer 20. Preferably, the difference between the index of refraction of optical waveguide layer 20 and the index of refraction of optical buffer layer 18 is at least 0.1%. Examples of materials suitable for optical buffer layer 18 comprise $SrTiO_3$, $BaTiO_3$, $Sr_xBa_{1-x}TiO_3$, $Sr_xZr_{1-x}TiO_3$, where $(0<x<1)$, $PbTiO_3$, $Pb_xLa_{1-x}(Zr_yTi_{1-y})O_3$, where $(0.7<x<1.0, 0<y<1.0)$, including PZT, PLT, PLZT depending on the values of x and y, $Pb(Mg_{1/3}Nb_{2/3})O_3$ and $KNbO_3$ for tetragonal system, rhombohedral system, orthorhombic system or pseudo cubic system, and $LiNbO_3$ and $LiTaO_3$ for hexagonal system, in $ABO_3$ perovskite type, and $Sr_xBa_{1-x}Nb_2O_6$, $Pb_xBa_{1-x}Nb_2O_6$ in tungsten bronze type and, in addition, $Bi_4Ti_3O_{12}$, $Pb_2KNb_5O_{15}$, $K_3Li_2Nb_5O_{15}$, as well as substituted derivatives of them. The thickness of optical buffer layer 18 suitably depends on the material that comprises optical buffer layer 18. As will be appreciated, in one exemplary embodiment, accommodating buffer layer 16 and optical buffer layer 18 may comprise the same materials; in this embodiment, accommodating buffer layer 16 and optical buffer layer 18 may comprise one continuous layer.

Monocrystalline optical waveguide layer 20 overlies accommodating buffer layer 16 and may overly optical buffer layer 18, if present. Optical waveguide layer 20 may be formed of any monocrystalline material that is suitable for forming an optical waveguide. Examples of materials suitable for forming optical waveguide layer 20 comprise $BaTiO_3$, $PbTiO_3$, $Pb_xLa_{1-x}(Zr_yTi_{1-y})O_3$, where $(0.7<x<1.0, 0<y<1.0)$, including PZT, PLT, PLZT depending on the values of x and y, $Pb(Mg_{1/3}Nb_{2/3})O_3$ and $KNbO_3$ for tetragonal system, orthorhombic system or pseudo cubic system, and $LiNbO_3$ and $LiTaO_3$ for hexagonal system, in $ABO_3$ perovskite type, and $Sr_xBa_{1-x}Nb_2O_6$, $Pb_xBa_{1-x}Nb_2O_6$ in tungsten bronze type and, in addition, $Bi_4Ti_3O_{12}$, $Pb_2KNb_5O_{15}$, $K_3Li_2Nb_5O_{15}$, as well as substituted derivatives of them. The thickness of optical waveguide layer 20 suitably depends on a desired application.

In another exemplary embodiment of the invention, optical waveguide structure 10 may also comprise a cladding layer 22, within which optical waveguide layer 20 may be disposed. As illustrated in FIG. 1, cladding layer 22 may overly optical waveguide layer 20. Cladding layer 22 may comprise any suitable dielectric material that has an index of refraction smaller than the material that comprises waveguide layer 20. Preferably, the difference between the index of refraction of optical waveguide layer 20 and the index of refraction of cladding layer 22 is at least 0.1%. Examples of materials suitable for cladding layer 22 comprise $SrTiO_3$, $BaTiO_3$, $SrxBa_{1-x}TiO_3$, $Sr_xZr_{1-x}TiO_3$, where $(0<x<1)$, $PbTiO_3$, $Pb_xLa_{1-x}(Zr_yTi_{1-y})O_3$, where $(0.7<x<1.0,)$, including PZT, PLT, PLZT depending on the values of x and y, $Pb(Mg_{1/3}Nb_{2/3})O_3$ and $KNbO_3$ for tetragonal system, rhombohedral system, orthorhombic system or pseudo cubic system, and $LiNbO_3$ and $LiTaO_3$ for hexagonal system, in $ABO_3$ perovskite type, and $Sr_xBa_{1-x}Nb_2O_6$, $Pb_xBa_{1-x}Nb_2O_6$ in tungsten bronze type and, in addition, $Bi_4Ti_3O_{12}$, $Pb_2KNb_5O_{15}$, $K_3Li_2Nb_5O_{15}$, as well as substituted derivatives of them.

Figure 2:
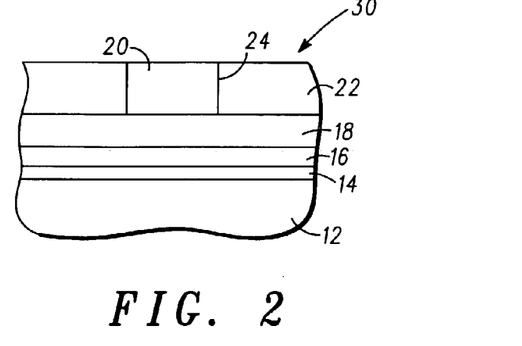

FIG. 2 illustrates, in cross section, a portion of an optical waveguide structure 30 in accordance with another embodiment of the invention. Structure 30 is similar to the previously described optical waveguide structure 10, as optical waveguide layer 20 is disposed within cladding layer 22. However, in this exemplary embodiment, optical waveguide layer 20 is embedded in a window or trench 24 formed in cladding layer 22, as described in more detail below.

Referring again to FIGS. 1 and 2, substrate 12 is a monocrystalline substrate such as a monocrystalline silicon or gallium arsenide substrate. The crystalline structure of the monocrystalline substrate is characterized by a lattice constant and by a lattice orientation. In similar manner, accommodating buffer layer 16 is also a monocrystalline material and the lattice of that monocrystalline material is characterized by a lattice constant and a crystal orientation. The lattice constants of the accommodating buffer layer and the monocrystalline substrate should be closely matched or, alternatively, should be such that upon rotation of one crystal orientation with respect to the other crystal orientation, a substantial match in lattice constants is achieved. In this context the terms "substantially equal" and "substantially matched" mean that there is sufficient similarity between the lattice constants to permit the growth of a high quality crystalline layer on the underlying layer.

In accordance with one embodiment of the invention, substrate 12 is typically a (100) oriented monocrystalline silicon substrate and accommodating buffer layer 16 is a layer of strontium titanate. Substantial (i.e., effective) matching of lattice constants between these two materials is achieved by rotating the crystal orientation of the titanate material by approximately 45° with respect to the crystal orientation of the silicon substrate. The inclusion in the structure of amorphous interface layer 14, a silicon oxide layer in this example, if it is of sufficient thickness, serves to reduce strain in the strontium titanate monocrystalline layer that might result from any mismatch in the lattice constants of the host silicon wafer and the grown strontium titanate layer. As a result, in accordance with an embodiment of the invention, a high quality, monocrystalline strontium titanate layer is achievable.

Still referring to FIGS. 1 and 2, optical buffer layer 18 is a layer of monocrystalline material that is also characterized by a crystal lattice constant and a crystal orientation. In accordance with one embodiment of the invention, the lattice constant of optical buffer layer 18 may differ from the lattice constant of substrate 12. To achieve high crystalline quality in this monocrystalline layer, the accommodating buffer layer must be of high crystalline quality. In addition, in order to achieve high crystalline quality in optical buffer layer 18, substantial matching between the crystal lattice constant of the host crystal, in this case, the monocrystalline accommodating buffer layer, and the grown crystal is desired. With properly selected materials this substantial matching of lattice constants may be achieved as a result of rotation of the crystal orientation of the grown crystal with respect to the orientation of the host crystal. Similarly, optical waveguide layer 20 is layer of monocrystalline material that is also characterized by a crystal lattice constant and a crystal orientation. To achieve high crystalline quality in optical waveguide layer 20, substantial matching between the crystal lattice constants of optical buffer layer 18 and optical waveguide layer 20 is desired. Again, rotation of the crystal orientation of the optical waveguide layer 20 with respect to the orientation of the optical buffer layer may facilitate substantial matching of the lattice constants of these two layers.

Figure 3:
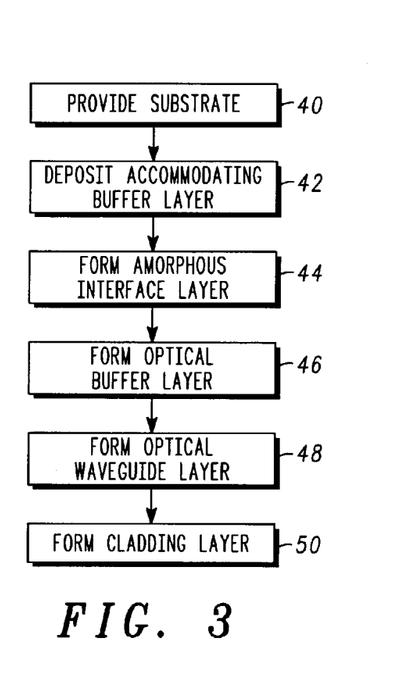
FIG. 3 is a flowchart illustrating a method for fabricating a device structure in accordance with an embodiment of the invention.

Referring to FIG. 3, the following example illustrates a process, in accordance with one embodiment of the invention, for fabricating a semiconductor structure such as the structure depicted in FIG. 1. The process starts by providing a monocrystalline semiconductor substrate, as illustrated in step 40. In accordance with an exemplary embodiment of the invention, the substrate comprises silicon or germanium. In accordance with a preferred embodiment of the invention, the semiconductor substrate is silicon having a (100) orientation. The substrate is oriented on axis or, at most, about 6° off axis, and preferably misoriented 1–3° off axis toward the [110] direction. At least a portion of the semiconductor substrate has a bare surface, although other portions of the substrate, as described below, may encompass other structures. The term "bare" in this context means that the surface in the portion of the substrate has been cleaned to remove any oxides, contaminants, or other foreign material. As is well known, bare silicon is highly reactive and readily forms a native oxide. The term "bare" is intended to encompass such a native oxide. A thin silicon oxide may also be intentionally grown on the semiconductor substrate, although such a grown oxide is not essential to the process in accordance with the invention. In order to epitaxially grow a monocrystalline oxide layer overlying the monocrystalline substrate, the native oxide layer must first be removed to expose the crystalline structure of the underlying substrate. The following process is preferably carried out by molecular beam epitaxy (MBE), although other epitaxial processes may also be used in accordance with the present invention. The native oxide can be removed by first thermally depositing a thin layer (preferably 1–3 monolayers) of strontium, barium, a combination of strontium and barium, or other alkaline earth metals or combinations of alkaline earth metals in an MBE apparatus. In the case where strontium is used, the substrate is then heated to a temperature above 720° C. as measured by an optical pyrometer to cause the strontium to react with the native silicon oxide layer. The strontium serves to reduce the silicon oxide to leave a silicon oxide-free surface. The resultant surface may exhibit an ordered (2×1) structure. If an ordered (2×1) structure has not been achieved at this stage of the process, the structure may be exposed to additional strontium until an ordered (2×1) structure is obtained. The ordered (2×1) structure forms a template for the ordered growth of an overlying layer of a monocrystalline oxide. The template provides the necessary chemical and physical properties to nucleate the crystalline growth of an overlying layer.

It is understood that precise measurement of actual temperatures in MBE equipment, as well as other processing equipment, is difficult, and is commonly accomplished by the use of a pyrometer or by means of a thermocouple placed in close proximity to the substrate. Calibrations can be performed to correlate the pyrometer temperature reading to that of the thermocouple. However, neither temperature reading is necessarily a precise indication of actual substrate temperature. Furthermore, variations may exist when measuring temperatures from one system to another system. For the purpose of this description, typical pyrometer temperatures will be used, and it should be understood that variations may exist in practice due to these measurement difficulties.

In accordance with an alternate embodiment of the invention, the native silicon oxide can be converted and the substrate surface can be prepared for the growth of a monocrystalline oxide layer by depositing an alkaline earth metal oxide, such as strontium oxide, strontium barium oxide, or barium oxide, onto the substrate surface by MBE at a low temperature and by subsequently heating the structure to a temperature of above 720° C. At this temperature a solid state reaction takes place between the strontium oxide and the native silicon oxide causing the reduction of the native silicon oxide and leaving an ordered (2×1) structure on the substrate surface. If an ordered (2×1) structure has not been achieved at this stage of the process, the structure may be exposed to additional strontium until an ordered (2×1) structure is obtained. Again, this forms a template for the subsequent growth of an ordered monocrystalline oxide layer.

Following the removal of the silicon oxide from the surface of the substrate, as illustrated in step 42, accommodating buffer layer 16 is deposited. Accommodating buffer layer 16 may be deposited using any suitable process such as chemical vapor deposition (CVD), metal organic chemical vapor deposition (MOCVD), migration enhanced epitaxy (MEE), atomic layer epitaxy (ALE), physical vapor deposition (PVD), chemical solution deposition (CSD), pulsed laser deposition (PLD), or the like. In accordance with one embodiment of the invention, the substrate is cooled to a temperature in the range of about 200–600° C., preferably 350–550° C., and a layer of strontium titanate is grown on the template layer by MBE. The MBE process is initiated by opening shutters in the MBE apparatus to expose strontium, titanium and oxygen sources. The ratio of strontium and titanium is approximately 1:1. The partial pressure of oxygen is initially set at a minimum value to grow stoichiometric strontium titanate at a growth rate of about 0.1–0.8 nm per minute, preferably 0.3–0.5 nm per minute. The stoichiometry of the titanium can be controlled during growth by monitoring RHEED patterns and adjusting the titanium flux.

After initiating growth of the strontium titanate, the partial pressure of oxygen is increased above the initial minimum value to form the amorphous interface layer, as illustrated in step 44. The overpressure of oxygen causes the growth of an amorphous silicon oxide layer at the interface between the underlying substrate and the strontium titanate layer. This step may be applied either during or after the growth of the strontium titanate layer. The growth of the amorphous silicon oxide layer results from the diffusion of oxygen through the strontium titanate layer to the interface where the oxygen reacts with silicon at the surface of the underlying substrate. The strontium titanate grows as an ordered (100) monocrystal with the (100) crystalline orientation rotated by 45° C. with respect to the underlying substrate. Strain that otherwise might exist in the strontium titanate layer because of the small mismatch in lattice constant between the silicon substrate and the growing crystal is relieved in the amorphous silicon oxide intermediate layer.

In another exemplary embodiment, after the accommodating buffer layer 16 has been grown to the desired thickness, the optical buffer layer may be formed, as illustrated in step 46. Optical buffer layer 18 may be formed by any suitable process such as MBE, CVD, MOCVD, MEE, ALE, PVD, CSD, PLD or a metal organic decomposition (MOD) process, such as the sol-gel method. In accordance with an exemplary embodiment of the invention, substrate 12 is transferred to suitable processing chamber for deposition of optical buffer layer 18 by sol-gel. A suitable precursor solution for PLZT (9/65/35) is applied to accommodating buffer layer 16. In a preferred embodiment, the precursor solution is spin-coated onto accommodating buffer layer 16, although it will be appreciated that the precursor solution may be applied by other methods, such as by dip coating, spraying, and the like. The precursor solution is spin-coated onto accommodating buffer layer 16, which is rotated at about 3000 rpm, for about 15 seconds to 5 minutes, preferably about 30 seconds. The thickness of the applied spin-coated layer is typically about 30–100 nm. Next, the coating is heated to a temperature of about 50 to 150° C., preferably about 100° C., for solvent evaporation and then is pyrolyzed at a temperature of about 300 to 500° C., preferably about 400° C., for about 30 seconds to about 5 minutes, preferably for about 1 minute, on a hot plate in air. The process of spin-coating followed by hot plate annealing typically may be repeated up to four times (depending on the desired thickness). A final rapid thermal anneal (RTA) then is conducted at a temperature of about 600 to 800° C., preferably about 700° C., for about 30 seconds to about 5 minutes, preferably about 1 minute, in an $O_2$ environment.

Next, the optical waveguide layer 20 is formed, as illustrated in step 48. Optical waveguide layer 20 may be formed by any suitable process such as MBE, CVD, MOCVD, MEE, ALE, PVD, CSD, PLD or MOD process, such as the sol-gel method. In one exemplary embodiment of the invention, optical waveguide layer 18 is formed by sol-gel. A suitable precursor solution for PZT is applied to the optical buffer layer 18. In a preferred embodiment, the precursor is spin-coated onto optical buffer layer 18, although it will be appreciated that the precursor solution may be applied by other methods, such as by dip coating, spraying and the like. The precursor solution is spin-coated onto optical buffer layer 18, which is rotated at about 3000 rpm, for about 15 seconds to 5 minutes, preferably about 30 seconds. The thickness of the applied spin-coated layer is typically about 30–100 nm. Next, the coating is heated to a temperature of about 50 to 150° C., preferably about 100° C., for solvent evaporation, and then is pyrolyzed at a temperature of about 300 to about 500° C., preferably about 400° C., for about 30 seconds to about 5 minutes, preferably about 1 minute, on a hot plate in air. The process of spin-coating followed by hot plate annealing typically may be repeated up to four times depending on the desired thickness. Next, the amorphous pyrolyzed layer is patterned to a desired waveguide shape. A patterned photoresist layer or other patterned mask layer is formed overlying the pyrolyzed layer and the pyrolyzed layer is etched using any suitable etch process, such as wet etching, reactive ion etching, or dry etching, such as plasma etching or ion beam etching. The patterned resist layer is removed. An epitaxial waveguide layer 20 then is obtained from the patterned amorphous pyrolyzed layer by subjecting the patterned amorphous pyrolyzed layer to RTA at a temperature of about 600 to 800° C., preferably about 700° C., for about 30 seconds to 5 minutes, preferably about 1 minute, in an $O_2$ environment. In another exemplary embodiment of the invention, the amorphous pyrolyzed layer may be subjected to RTA before patterning and etching to form optical waveguide layer 20.

In another exemplary embodiment, cladding layer 22 then may be formed overlying optical waveguide 20, as illustrated in step 50. Cladding layer 22 may be formed by any suitable process such as MBE, CVD, MOCVD, MEE, ALE, PVD, CSD, PLD or an MOD process, such as the sol-gel method. In accordance with an exemplary embodiment of the invention, cladding layer 22 is formed by sol-gel using the method described above for forming optical buffer layer 18.

Figure 4:
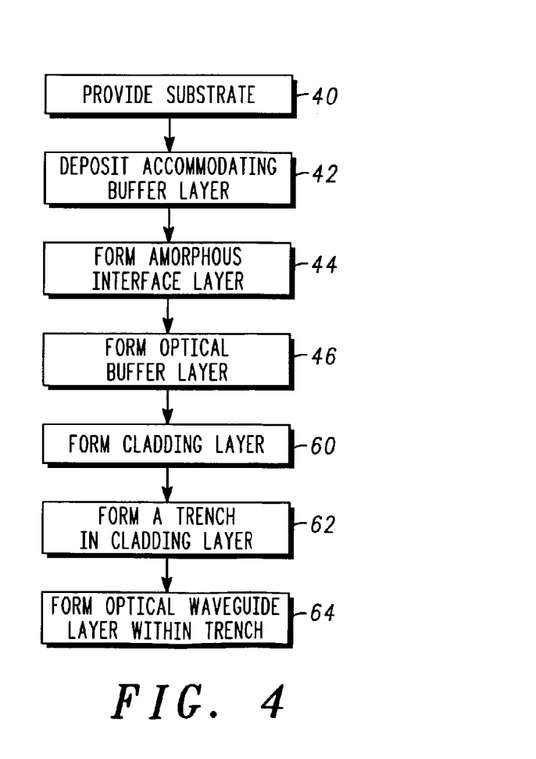
FIG. 4 is a flowchart illustrating a method for fabricating a device structure in accordance with another embodiment of the invention.

Referring to FIG. 4, the following example illustrates a process, in accordance with one embodiment of the invention, for fabricating a semiconductor structure such as the structure depicted in FIG. 2. Steps 40 through 44 are performed as described above with references to FIG. 3. Step 46 also comprises the same process as step 46 with reference to FIG. 3. However, for purposes of this exemplary embodiment, optical buffer layer 18 may comprise strontium titanate. In accordance with an exemplary embodiment of the invention, optical buffer layer 18 is formed by sol-gel, although it will be appreciated that optical buffer layer 18 may be formed by any suitable process such as MBE, CVD, MOCVD, MEE, ALE, PVD, CSD, PLD, other MOD processes, and the like. In this embodiment, a suitable precursor, such as one comprising strontium-ethylhexanoate and titanium-ethylhexanoate precursors, is applied to accommodating buffer layer 16. In a preferred embodiment, the precursor solution is spin-coated onto accommodating buffer layer 16, although it will be appreciated that the precursor solution may be applied by other methods, however, such as by dip coating, spraying, and the like. The precursor solution is spin-coated onto accommodating buffer layer 16, which is rotated at about 3000 rpm, for about 15 seconds to 5 minutes, preferably about 30 seconds. The thickness of the spin-coated layer is typically about 30–100 nm. Next, the coating is heated to a temperature of about 50 to 150° C., preferably about 100° C., for solvent evaporation and then is pyrolyzed at a temperature of about 300 to 500° C., preferably about 400° C., for about 30 seconds to about 5 minutes, preferably for 1 minute, on a hot plate in air. The process of spin-coating followed by hot plate annealing typically may be repeated up to four times (depending on the desired thickness). A final rapid thermal anneal (RTA) then is conducted at a temperature of about 600 to 800° C., preferably about 700° C., for about 30 seconds to about 5 minutes, preferably about 1 minute, in an $O_2$ environment.

Next, cladding layer 22 then may be formed overlying optical buffer layer 18, as illustrated in step 60. In accordance with an exemplary embodiment of the invention, cladding layer 22 is formed by sol-gel, although it will be appreciated that cladding layer 22 may be formed by an suitable process such as MBE, CVD, MOCVD, MEE, ALE, PVD, CSD, PLD, other MOD processes, and the like. A suitable precursor solution for PLZT (9/65/35) is applied to optical buffer layer 18. In a preferred embodiment, the precursor solution is spin-coated onto optical buffer layer 18, although it will be appreciated that the precursor solution may be applied by other methods such as by dip coating, spraying, and the like. The precursor solution is spin-coated onto optical buffer layer 18, which is rotated at about 3000 rpm, for about 15 seconds to 5 minutes, preferably about 30 seconds. The thickness of the spin-coated layer is typically about 30–100 nm. Next, the coating is heated to a temperature of about 50 to 150° C., preferably about 100° C., for solvent evaporation and then is pyrolyzed at a temperature of about 300 to 500° C., preferably about 400° C., for about 30 seconds to about 5 minutes, preferably for 1 minute, on a hot plate in air. The process of spin-coating followed by hot plate annealing typically may be repeated up to four times (depending on the desired thickness). Next, as illustrated in step 62, the amorphous pyrolyzed layer is patterned to form a window or trench of a suitable size and shape for a subsequently embedded waveguide layer. A patterned photoresist layer or other patterned mask layer is formed overlying the pyrolyzed layer and the pyrolyzed layer is etched using any suitable etch process, such as wet etching, reactive ion etching, or dry etching, such as plasma etching or ion beam etching. The patterned resist is removed and a final rapid thermal anneal (RTA) then is conducted at a temperature of about 600 to about 800° C., preferably about 700° C., for about 30 seconds to about 5 minutes, preferably about 1 minute, in an $O_2$ environment to form an epitaxial cladding layer.

Next, optical waveguide layer 20 may be formed using any suitable process as described above. Preferably, optical waveguide layer 20 is formed by sol-gel. A suitable precursor solution for PZT is applied overlying the cladding layer 22 and within trench 24. In a preferred embodiment, the precursor is spin-coated onto cladding layer 22, although it will be appreciated that the precursor solution may be applied by other methods, such as by dip coating, spraying and the like. The precursor solution is spin-coated onto cladding layer 22, which is rotated at about 3000 rpm, for about 15 seconds to 5 minutes, preferably about 30 seconds. Next, the coating is heated to a temperature of about 50 to 150° C., preferably about 100° C., for solvent evaporation, and then is pyrolyzed at a temperature of about 300 to about 500° C., preferably about 400° C., for about 30 seconds to about 5 minutes, preferably about 1 minute, on a hot plate in air. The process of spin-coating followed by hot plate annealing typically may be repeated up to four times depending on the desired thickness. An epitaxial waveguide layer 20 then is obtained from the amorphous pyrolyzed layer by subjecting the amorphous pyrolyzed layer to RTA at a temperature of about 600 to 800° C., preferably about 700° C., for about 30 seconds to 5 minutes, preferably about 1 minute, in an $O_2$ environment. The epitaxial waveguide layer 20 may then be planarized using any suitable planarization technique such as, for example, wet or dry etching, chemical mechanical planarization, and the like. A top cladding layer (not shown) then may be formed overlying cladding layer 22 and optical waveguide layer 20 using any of the above-described methods.

The process described above illustrates a process for forming an optical waveguide structure including a silicon substrate, an overlying strontium titanate accommodating buffer layer, a monocrystalline optical waveguide layer comprising PZT and a cladding layer comprising PLZT. By a similar process, other monocrystalline accommodating buffer layers comprising materials such as alkaline earth metal titanates, zirconates, hafnates, tantalates, vanadates, ruthenates, niobates, alkaline earth metal tin-based perovskites, lanthanum aluminate, lanthanum scandium oxide, and gadolinium oxide can also be grown. Further, by a similar process, other monocrystalline optical waveguide layers and cladding layers comprising other materials can be deposited overlying the monocrystalline accommodating buffer layer.

From the foregoing description, it should be appreciated that there has been provided, in accordance with various embodiments of the present invention, an optical waveguide structure and a method for fabricating an optical waveguide structure that fully meets the needs set forth above. Although various embodiments of the invention have been described and illustrated with reference to specific embodiments thereof, it is not intended that the invention be limited to such illustrative embodiments. For example, while the optical waveguide structure is described comprising a substrate, an amorphous interface layer, an accommodating buffer layer, an optical buffer layer, an optical waveguide layer and a cladding layer, it will be appreciated that the optical waveguide structure is not limited to these layers and may comprise additional layers. Those of skill in the art will recognize that many variations and modifications of such embodiments are possible without departing from the spirit of the invention. Accordingly, it is intended to encompass within the invention all such modifications and variations as fall within the scope of the appended claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An optical waveguide structure comprising:
   a monocrystalline substrate;
   an amorphous oxide material in contact with the monocrystalline substrate;
   a monocrystalline metal oxide layer selected from the group consisting of alkaline earth metal titanates, alkaline earth metal zirconates, alkaline earth metal hafnates, alkaline earth metal tantalates, alkaline earth metal ruthenates, alkaline earth metal niobates, alkaline earth metal vanadates, alkaline earth metal tin-based perovskites, lanthanum aluminate, lanthanum scandium oxide, gadolinium oxide and mixtures thereof contacting the amorphous oxide material; and
   an optical waveguide layer overlying said metal oxide layer,
   said structure further comprising a cladding layer overlying said metal oxide layer, said optical waveguide layer disposed at least partially within said cladding layer.

2. The optical waveguide structure of claim 1, further comprising an optical buffer layer overlying said metal oxide layer and underlying said optical waveguide layer.

3. The optical waveguide structure of claim 1, wherein said optical waveguide layer is disposed within a window formed in said cladding layer.

4. The optical waveguide structure of claim 1, wherein said cladding layer overlies said optical waveguide layer.

5. The optical waveguide structure of claim 1, said monocrystalline substrate comprising one of silicon, germanium, a combination of silicon and germanium, a combination of silicon and carbon, a combination of silicon, germanium and carbon, and a silicon-on-insulator.

6. The optical waveguide structure of claim 2, wherein said optical buffer layer comprises a dielectric material that has an index of refraction smaller than an index of refraction of a material that comprises said optical waveguide layer.

7. The optical waveguide structure of claim 6, wherein said optical waveguide layer comprises a dielectric material having a first index of refraction and said optical buffer layer comprises a dielectric material having a second index of refraction and a difference between said first index of refraction and said second index of refraction is at least 0.1%.

8. The optical waveguide structure of claim 2, wherein said optical buffer layer comprises one of $SrTiO_3$, $BaTiO_3$, $Sr_xBa_{1-x}TiO_3$, $Sr_xZr_{1-x}TiO_3$, where (0<x<1), $PbTiO_3$, $Pb_xLa_{1-x}(Zr_yTi_{1-y})O_3$, where (0.7<x<1.0, 0<y<1.0), $Pb(Mg_{1/3}Nb_{2/3})O_3$, $KNbO_3$, $LiNbO_3$, $LiTaO_3$, $Sr_xBa_{1-x}Nb_2O_6$, $Pb_xBa_{1-x}Nb_2O_6$, $Bi_4Ti_3O_{12}$, $Pb_2KNb_5O_{15}$, $K_3Li_2Nb_5O_{15}$, and substituted derivatives thereof.

9. The optical waveguide structure of claim 1, wherein said optical waveguide layer comprises one of $BaTiO_3$, $PbTiO_3$, $Pb_xLa_{1-x}(Zr_yTi_{1-y})O_3$, where (0.7<x<1.0, 0<y<1.0), $Pb(Mg_{1/3}Nb_{2/3})O_3$, $KNbO_3$, $LiNbO_3$, $LiTaO_3$, $Sr_xBa_{1-x}Nb_2O_6$, $Pb_xBa_{1-x}Nb_2O_6$, $Bi_4Ti_3O_{12}$, $Pb_2KNb_5O_{15}$, $K_3Li_2Nb_5O_{15}$, and substituted derivatives thereof.

10. The optical waveguide structure of claim 1, wherein said cladding layer comprises a dielectric material that has an index of refraction that is smaller than an index of refraction of a material that comprises said optical waveguide layer.

11. The optical waveguide structure of claim 10, wherein said optical waveguide layer comprises a dielectric material having a first index of refraction and said cladding layer comprises a dielectric material having a second index of refraction and a difference between said first index of refraction and said second index of refraction is at least 0.1%.

12. The optical waveguide structure of claim 1, wherein said cladding layer comprises one of $SrTiO_3$, $BaTiO_3$, $Sr_xBa_{1-x}TiO_3$, $Sr_xZr_{1-x}TiO_3$, where (0<x<1), $PbTiO_3$, $Pb_xLa_{1-x}(Zr_yTi_{1-y})O_3$, where (0.7<x<1.0, 0<y<1.0), $Pb(Mg_{1/3}Nb_{2/3})_3$, $KNbO_3$, $LiNbO_3$, $LiTaO_3$, $Sr_xBa_{1-x}Nb_2O_6$, $Pb_xBa_{1-x}Nb_2O_6$, $Bi_4Ti_3O_{12}$, $Pb_2KNb_5O_{15}$, $K_3Li_2Nb_5O_{15}$, and substituted derivatives thereof.

13. The optical waveguide structure of claim 1, said monocrystalline substrate comprising silicon and said amorphous oxide comprising a silicon oxide.

14. The optical waveguide structure of claim 2, wherein said optical buffer layer has a first lattice constant and said metal oxide layer has a second lattice constant, said second lattice constant being substantially matched to said first lattice constant.

15. The optical waveguide structure of claim 2, wherein said optical waveguide layer has a first lattice constant and said optical buffer layer has a second lattice constant, said second lattice constant being substantially matched to said first lattice constant.

16. The optical waveguide structure of claim 1, wherein said amorphous oxide has a thickness in the range of about 0.5 to 5 nm.

17. n optical waveguide structure comprising:

a monocrystalline substrate;

an amorphous interface layer overlying said monocrystalline substrate;

an accommodating buffer layer overlying said amorphous interface layer; and an optical waveguide layer overlying said accommodating buffer layer, said optical waveguide structure further comprising a cladding layer comprising one of $SrTiO_3$, $BaTiO_3$, $Sr_xBa_{1-x}TiO_3$, $Sr_xZr_{1-x}TiO_3$, where (0<x<1), $PbTiO_3$, $Pb_xLa_{1-x}(Zr_yTi_{1-y})O_3$, where (0.7<x<1.0, 0<y<1.0), $Pb(Mg_{1/3}Nb_{2/3})O_3$, $KNbO_3$, $LiNbO_3$, $LiTaO_3$, $Sr_xBa_{1-x}Nb_2O_6$, $Pb_xBa_{1-x}Nb_2O_6$, $Bi_4Ti_3O_{12}$, $Pb_2KNb_5O_{15}$, $K_3Li_2Nb_5O_{15}$, and substituted derivatives thereof overlying said accommodating buffer layer, said optical waveguide layer disposed at least partially within said cladding layer.

* * * * *